(12) United States Patent
Lee et al.

(10) Patent No.: US 8,094,250 B2
(45) Date of Patent: Jan. 10, 2012

(54) WIDE VIEWING ANGLE LIQUID CRYSTAL DISPLAY WITH HIGH RESPONSE SPEED

(75) Inventors: Seung-Hee Lee, Jeonju-si (KR);
Seong-Jin Hwang, Jeonju-si (KR);
Jong-Ho Son, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 361 days.

(21) Appl. No.: 12/405,804

(22) Filed: Mar. 17, 2009

(65) Prior Publication Data
US 2010/0002157 A1    Jan. 7, 2010

(30) Foreign Application Priority Data

Jul. 4, 2008    (KR) .................. 10-2008-0065077

(51) Int. Cl.
*G02F 1/1343*    (2006.01)
(52) U.S. Cl. .......................................... 349/38; 349/139
(58) Field of Classification Search .................. 349/38, 349/39, 138, 139
See application file for complete search history.

(56) References Cited

U.S. PATENT DOCUMENTS

| | | | |
|---|---|---|---|
| 7,400,368 B2* | 7/2008 | Chen et al. ...................... | 349/86 |
| 7,714,821 B2* | 5/2010 | Seen ............................... | 345/87 |
| 2007/0177096 A1* | 8/2007 | Uchida et al. .................. | 349/177 |
| 2008/0180385 A1* | 7/2008 | Yoshida et al. ............... | 345/102 |

* cited by examiner

*Primary Examiner* — Akm Ullah
(74) *Attorney, Agent, or Firm* — F. Chau & Associates, LLC

(57) ABSTRACT

A liquid crystal display according to an exemplary embodiment of the present invention includes a first field generating electrode with a plurality of cutouts. A thin film transistor is connected to the first field generating electrode. An auxiliary electrode is overlapped with one or more of the plurality of cutouts of the first field generating electrode, and is floated during the period of image display. A second field generating electrode faces the first field generating electrode and a liquid crystal layer is interposed between the first and second field generating electrodes. The liquid crystal layer includes a plurality of liquid crystal molecules and photo-polymers.

22 Claims, 15 Drawing Sheets

(a)                               (b)

WIDE VIEWING ANGLE LIQUID CRYSTAL DISPLAY WITH HIGH RESPONSE SPEED

CROSS-REFERENCE TO RELATED APPLICATION

This application claims priority to Korean Patent Application No. 10-2008-0065077 filed in the Korean Intellectual Property Office on Jul. 4, 2008, the entire contents of which are incorporated herein by reference.

BACKGROUND OF THE INVENTION (a) Technical Field

The present invention relates to a liquid crystal display, and more particularly, to a wide viewing angle liquid crystal display with a high response speed.

(b) Discussion of the Related Art

Liquid crystal displays are a widely used example of flat panel displays. A liquid crystal display includes two substrates on which field generating electrodes such as pixel electrodes and common electrodes are formed, and a liquid crystal layer which is interposed between the substrates. In the liquid crystal display, voltages are applied to the field generating electrodes so as to generate an electric field over the liquid crystal layer. Then the alignment of liquid crystal molecules of the liquid crystal layer is determined by the generated electric field. Accordingly, the polarization of incident light is controlled, and an image may be displayed thereby.

A vertical alignment (VA) mode liquid crystal display is an example of a liquid crystal display in which the long axis of the liquid crystal molecules remain perpendicular to the upper and lower display panels when no electric field is applied thereto. VA liquid crystal displays have a high contrast ratio and a wide reference viewing angle (defined as the viewing angle at which the contrast ratio is equal to 1:10 or as the limit angle for the inversion in luminance between the grays).

The wide viewing angle of the vertical alignment (VA) mode liquid crystal display (LCD) can be realized by either cutouts or protrusions formed on the field generating electrodes. Since the cutouts or protrusions can determine the inclination directions of liquid crystal molecules, cutouts and protrusions may be arranged along the field generating electrodes to thereby widen the reference viewing angle. However, existing techniques of forming the cutouts or protrusions in the vicinity of the pixel and the common electrodes can complicate the manufacturing process for the liquid crystal displays. Furthermore, in vertical alignment (VA) mode liquid crystal displays having the protrusions or cutouts, the liquid crystal molecules close to the cutouts or protrusions are controlled to a greater extent than those liquid crystal molecules that are farther away from the cutouts or protrusions thereby lowering the response speed of the display device.

In order to overcome such a problem, it has been suggested that a direction controlling electrode be formed under the cutouts of the pixel electrode so as to divide one pixel into two or more pixel electrodes, thereby realizing a wide viewing angle. However, when forming the direction controlling electrode, a wide viewing angle is obtained only when the voltages applied to the pixel electrode, the common electrode, and the direction controlling electrode satisfy predetermined conditions. Accordingly, different signals should be input into two or more pixel electrodes and the direction controlling electrode for each image frame. However, this causes the driving of the liquid crystal display to be complicated.

SUMMARY OF THE INVENTION

Exemplary embodiments of the present invention seek to provide a vertical alignment (VA) mode liquid crystal display having a wide viewing angle and high transmittance without complicating the driving and the manufacturing process thereof.

An exemplary embodiment of the present invention provides a liquid crystal display having a first field generating electrode with a plurality of cutouts, and a thin film transistor connected to the first field generating electrode. An auxiliary electrode is overlapped with a part of the plurality of cutouts of the first field generating electrode, and is floated during a period of image display. A second field generating electrode faces the first field generating electrode. A liquid crystal layer is interposed between the first and second field generating electrodes, and the liquid crystal layer includes a plurality of liquid crystal molecules and photo-polymers.

The auxiliary electrode may receive a predetermined voltage during the period of initial aligning, and may be floated during the period of image display.

The voltage applied to the auxiliary electrode may be greater than the voltage applied to the first field generating electrode.

The voltage applied to the auxiliary electrode may be about two times greater than the voltage applied to the first field generating electrode. The second field generating electrode may have a continuous surface. The auxiliary electrode may be under the first field generating electrode. The liquid crystal molecules may be pre-tilted in a plurality of different directions. The liquid crystal molecules may be pre-tilted by the photo-polymers.

The pre-tilt direction of the liquid crystal molecules may be determined based upon the magnitude of the voltages applied to the auxiliary electrode and the first and second field generating electrodes during the period of initial aligning and the cutouts.

The liquid crystal display may further include data and gate lines connected to the thin film transistor. The cutouts may extend at an oblique angle to the gate lines or the data lines. The oblique angle may be about 45 degrees.

The auxiliary electrode may be similar in planar shape to the cutouts overlapped therewith. The auxiliary electrode may be larger in width than the cutouts and may be partially overlapped with the first field generating electrode.

The width of the cutouts may be about 3.5 µm to 4.5 µm, and the auxiliary electrode and the first field generating electrode may be overlapped with each other at both sides of the cutouts. The width of the overlapped region between the auxiliary electrode and the first field generating electrode may be about 1.5 µm to 2.5 µm. At least a part of the auxiliary electrode may be exposed through the cutouts of the first field generating electrode.

A liquid crystal display according to an exemplary embodiment of the present invention includes an auxiliary electrode overlapped with one or more cutouts of a pixel electrode. The auxiliary electrode receives a predetermined voltage during a period of initial aligning of a liquid crystal layer, and is floated during a period of image display of the liquid crystal display. The initial photo-alignment of the liquid crystal molecules is performed while predetermined voltages are applied to the auxiliary electrode, the pixel electrode, and a common electrode. With this structure, the liquid crystal display can include a plurality of sub-regions in each of which the pre-tilt direction of the liquid crystal molecules is differentiated. Moreover, with this structure, direction controlling members such as cutouts at the common electrode, need not be formed and thus a high response speed may be realized. Furthermore, a predetermined voltage is applied to the auxiliary electrode during the period of initial aligning, and the auxiliary electrode is floated during the period of image display, thereby realizing a wide viewing angle without complicating the driving of the liquid crystal display.

BRIEF DESCRIPTION OF THE DRAWINGS

The above and other features and aspects of the exemplary embodiments of the present invention will be described in detail with reference to the accompanying drawings, in which.

DETAILED DESCRIPTION OF THE EXEMPLARY EMBODIMENTS

Figure 1:
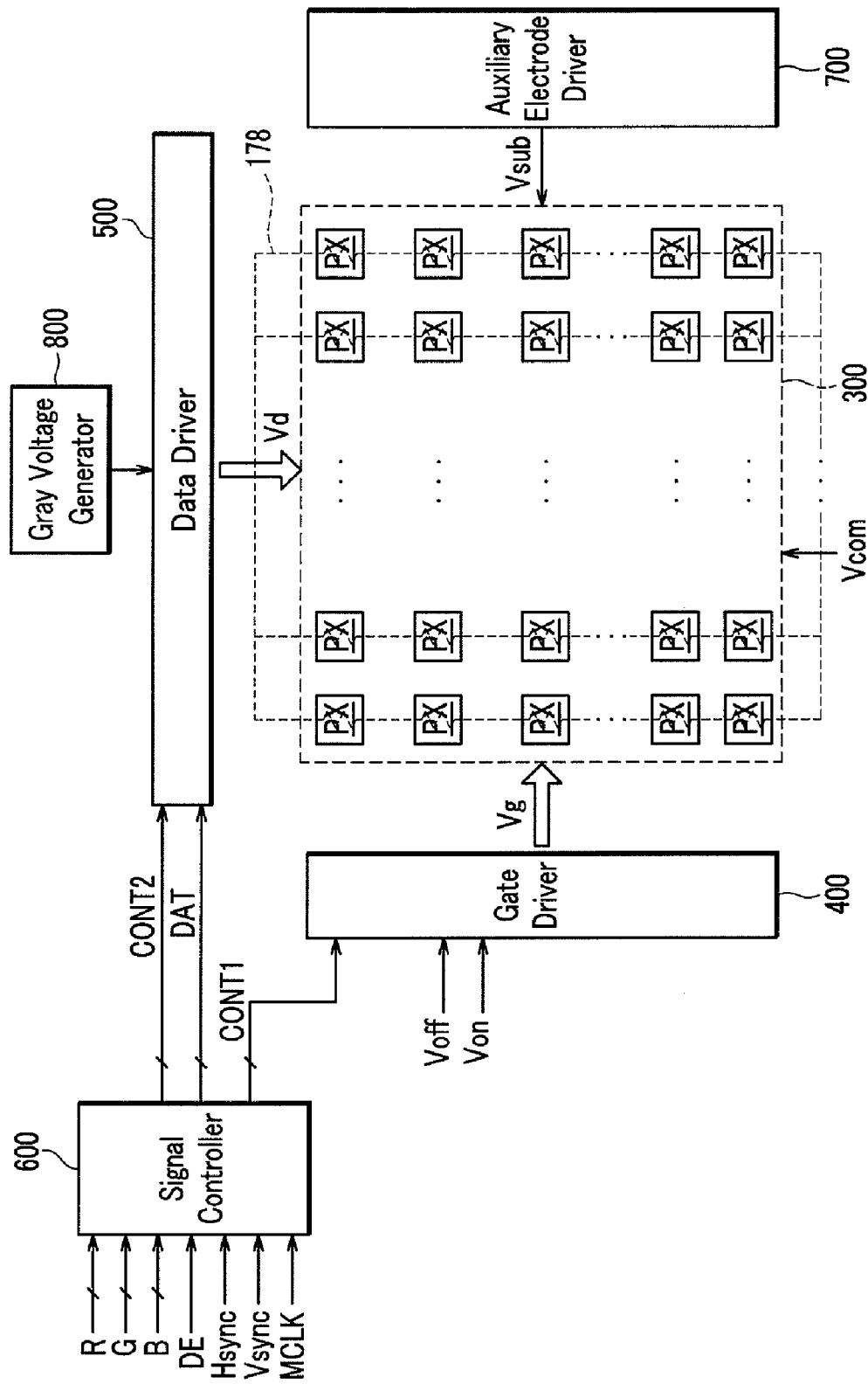
FIG. 1 is a block diagram of a liquid crystal display according to an exemplary embodiment of the present invention.

Exemplary embodiments of the present invention will be described more fully hereinafter with reference to the accompanying drawings. As those skilled in the art would realize, the described exemplary embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

A liquid crystal display according to an exemplary embodiment of the present invention will be described in detail with reference to the drawings.

Figure 2:
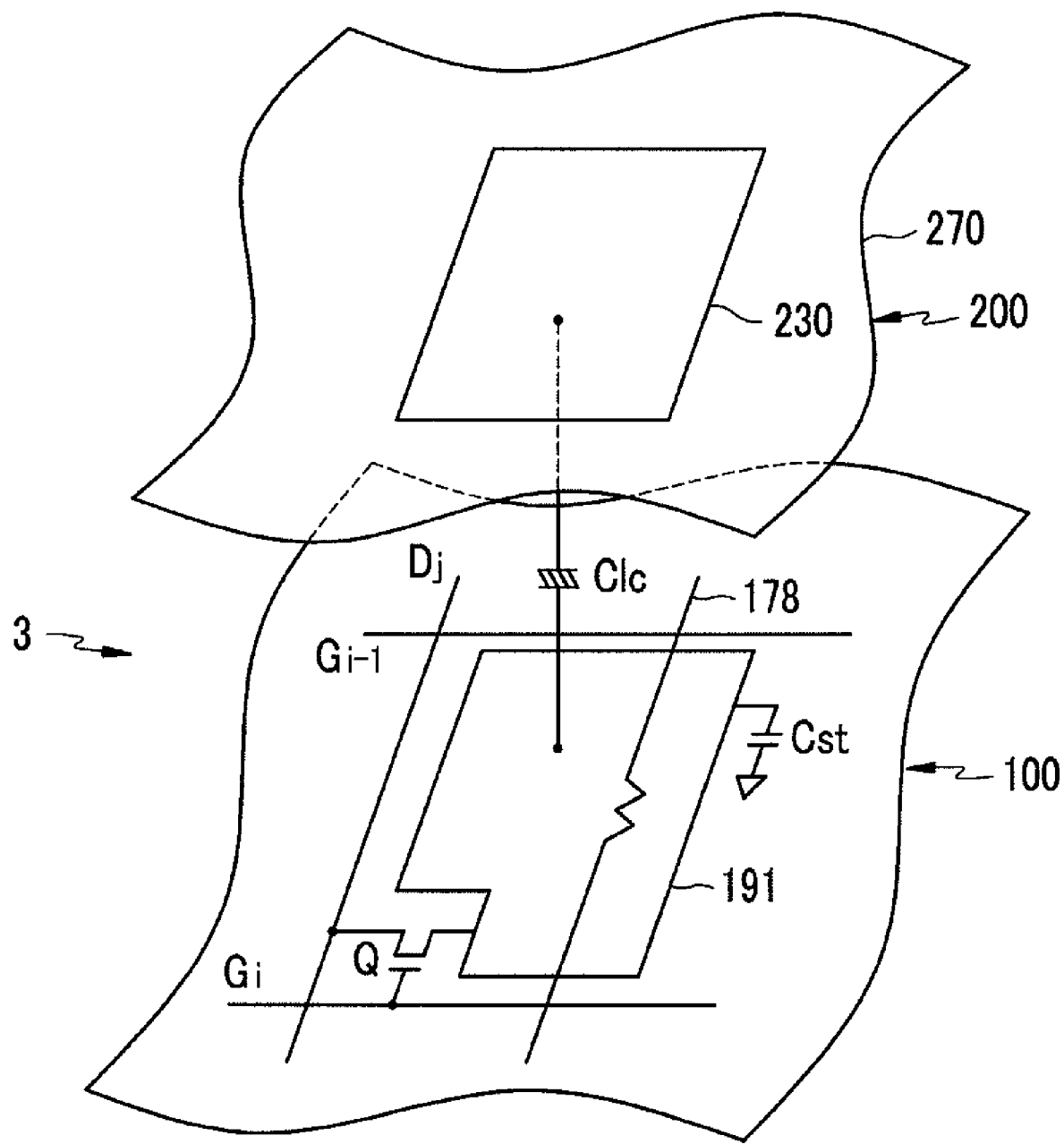
FIG. 2 is an equivalent circuit diagram of one pixel in a liquid crystal display according to an exemplary embodiment of the present invention.

FIG. 1 is a block diagram of a liquid crystal display according to an exemplary embodiment of the present invention, and FIG. 2 is an equivalent circuit diagram of one pixel in a liquid crystal display according to an exemplary embodiment of the present invention.

Referring to FIG. 1, a liquid crystal display according to an exemplary embodiment of the present invention includes a liquid crystal panel assembly 300, a gate driver 400, a data driver 500, an auxiliary electrode driver 700, a gray voltage generator 800, and a signal controller 600.

As shown in FIG. 1, from the viewpoint of an equivalent circuit, the liquid crystal panel assembly 300 includes a plurality of signal lines (not shown), and a plurality of pixels PX connected to the signal lines and arranged in the form of a matrix. By contrast, from the viewpoint of the structure shown in FIG. 2, the liquid crystal panel assembly 300 includes lower and upper panels 100 and 200, and a liquid crystal layer 3 interposed between the lower and upper panels 100 and 200.

Referring to FIG. 2, the signal lines $G_1$ to $G_n$ and $D_1$ to $D_m$ include a plurality of gate lines $G_1$ to $G_n$ for carrying gate signals (also referred to as "scanning signals"), and a plurality of data lines $D_1$ to $D_m$ for carrying data voltages. The gate lines $G_1$ to $G_n$ are aligned roughly in the row direction such that they are substantially parallel to each other, and the data lines $D_1$ to $D_m$ are aligned roughly in the column direction such that they are substantially parallel to each other.

The respective pixels PX, for example, a pixel PX connected to an i-th (i=1, 2, . . . , n) gate line $G_i$ and a j-th (j=1, 2, . . . , m) data line $D_j$ includes a switching element Q connected to the signal lines $G_i$ and $D_j$, and a liquid crystal capacitor Clc and a storage capacitor Cst connected to the switching element Q. When desired, the storage capacitor Cst may be omitted.

The switching element Q is a three terminal element such as a thin film transistor provided at the lower panel 100, of which the control terminal is connected to the gate line $G_i$ and the input terminal is connected to the data line $D_j$, while the output terminal is connected to the liquid crystal capacitor Clc and the storage capacitor Cst.

The liquid crystal capacitor Clc takes a pixel electrode 191 of the lower panel 100 and a common electrode 270 of the upper panel 200 as two terminals thereof, and the liquid crystal layer 3 interposed between the two electrodes 191 and 270 functions as a dielectric material. The pixel electrode 191 is connected to the switching element Q, and the common electrode 270 is formed on the entire surface of the upper panel 200 to receive a common voltage Vcom. An auxiliary electrode 178 is formed at each of the respective pixels such that the auxiliary electrodes 178 are electrically connected to each other. The auxiliary electrode 178 receives a predetermined voltage through the auxiliary electrode driver 700.

The liquid crystal layer 3 may have negative dielectric anisotropy, and liquid crystal molecules of the liquid crystal layer 3 may be aligned such that the directors thereof stand vertical to the surface of the two display panels 100 and 200.

The storage capacitor Cst may enhance the function of the liquid crystal capacitor Clc and may be formed by overlapping a separate signal line (not shown) provided at the lower panel 100 with the pixel electrode 191 by interposing an insulator. A predetermined voltage such as a common voltage Vcom is applied to the separate signal line. Alternatively, the storage capacitor Cst may be formed through overlapping the pixel electrode 191 with the immediately previous gate line $G_{i-1}$ by interposing an insulator.

Each pixel PX uniquely displays one of the primary colors (spatial division), or the respective pixels PX alternately displays the primary colors in a temporal manner (temporal division), so that the target color can be recognized as the spatial or temporal sum of the primary colors. For example, the primary colors may be red, green, and blue. FIG. 2 is an example of the spatial division where each pixel PX is provided with a color filter 230 expressing one of the primary colors at the region of the upper panel 200 corresponding to the pixel electrode 191. As an alternative to the structure shown in FIG. 2, the color filter 230 may be provided at the lower panel 100 over or under the pixel electrode 191.

At least one polarizer (not shown) is provided at the liquid crystal panel assembly 300.

Referring to FIG. 1 again, the gray voltage generator 800 generates all gray voltages related to the transmittance of the pixel PX, or a limited number of gray voltages (referred to hereinafter as "reference gray voltages"). The (reference) gray voltages may include those having a positive value with respect to the common voltage Vcom, and those with a negative value.

The gate driver 400 is connected to the gate lines $G_1$ to $G_n$ of the liquid crystal panel assembly 300 and applies gate signals composed of the combinations of gate-on voltages Von and gate-off voltages Voff to the gate lines $G_1$ to $G_n$.

The data driver 500 is connected to the data lines $D_1$ to $D_m$ of the liquid crystal panel assembly 300 and selects the gray voltages from the gray voltage generator 800 and apply them to the data line $D_1$ to $D_m$ as data voltages. However, when the gray voltage generator 800 generates fewer than all of the gray voltages, the data driver 500 divides those reference gray voltages and generates the desired data voltages.

The signal controller 600 controls the gate driver 400 and the data driver 500. The respective drivers 400, 500, 600, and 800 may be directly mounted on the liquid crystal panel assembly 300 in the form of at least one IC chip. The drivers 400, 500, 600, and 800 may alternatively be attached to the liquid crystal panel assembly 300 in the form of a tape carrier package (TCP) while being mounted on a flexible printed circuit film (not shown) or may be mounted on a separate printed circuit board (not shown). Alternatively, the drivers 400, 500, 600, and 800 may be integrated with the liquid crystal panel assembly 300 together with the signal lines $G_1$ to $G_n$ and $D_1$ to $D_m$, the thin film transistor switching elements Q, and the like. Furthermore, the drivers 400, 500, 600, and 800 may be integrated in the form of a single chip, and in this case, one of the drivers or at least one of the driver-formation circuit elements may be placed external to the signal chip.

The auxiliary electrode driver 700 applies a predetermined voltage to the auxiliary electrodes 178 connected to each other. The voltage application of the auxiliary electrode driver 700 to the auxiliary electrodes is performed during the period of initial alignment of the liquid crystal layer, and no voltages are applied thereto during the period of image display of the liquid crystal display. The auxiliary electrode driver 700 may be attached to the liquid crystal panel assembly 300 or formed external to the liquid crystal panel assembly 300.

A liquid crystal panel assembly 300 according to an exemplary embodiment of the present invention will be described in detail with reference to FIG. 3 to FIG. 5.

Figure 3:
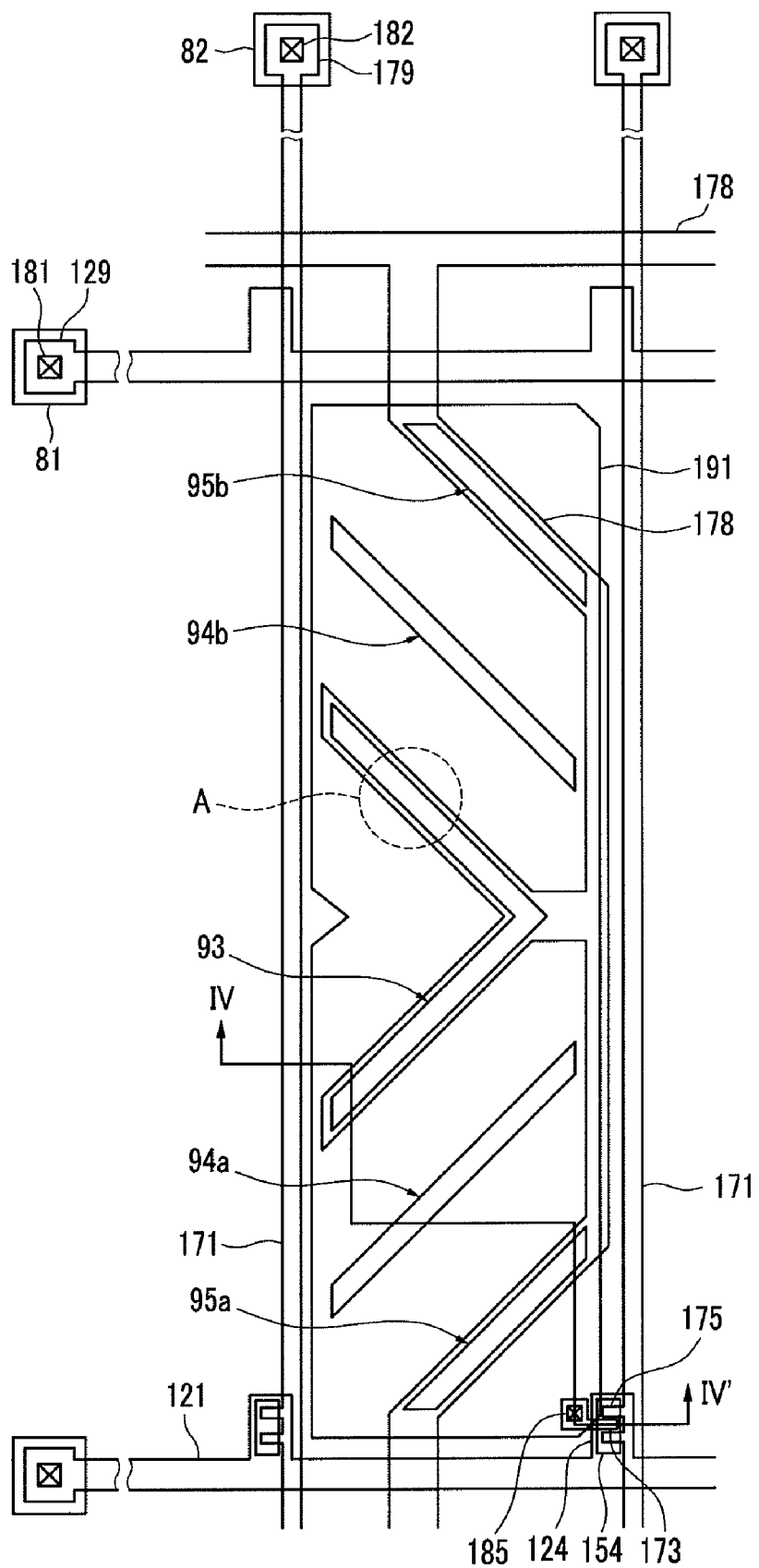
FIG. 3 is a layout view of a liquid crystal display according to an exemplary embodiment of the present invention.
Figure 4:
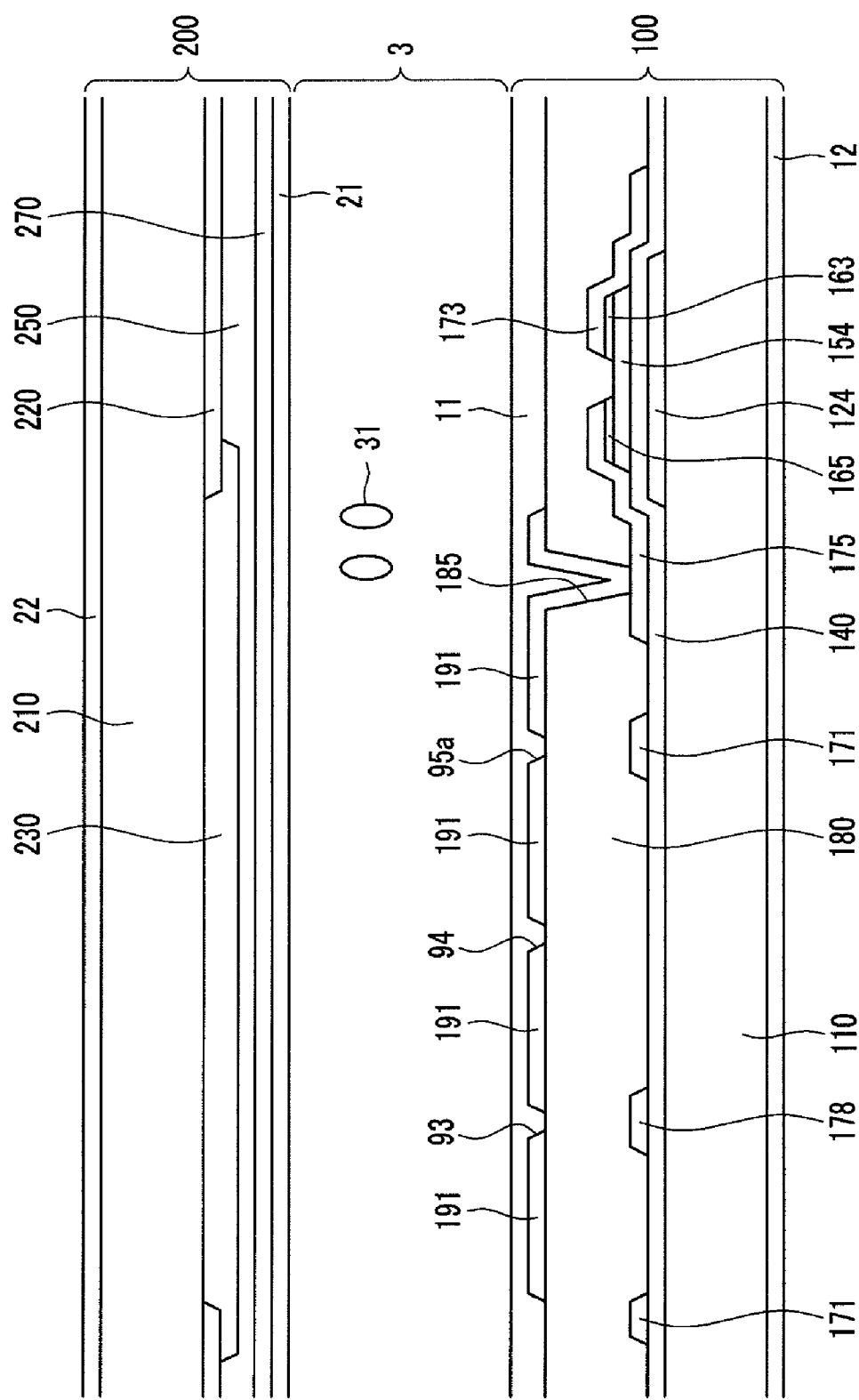
FIG. 4 is a cross-sectional view of the liquid crystal display shown in FIG. 3 taken along the IV-IV' line thereof.
Figure 5:
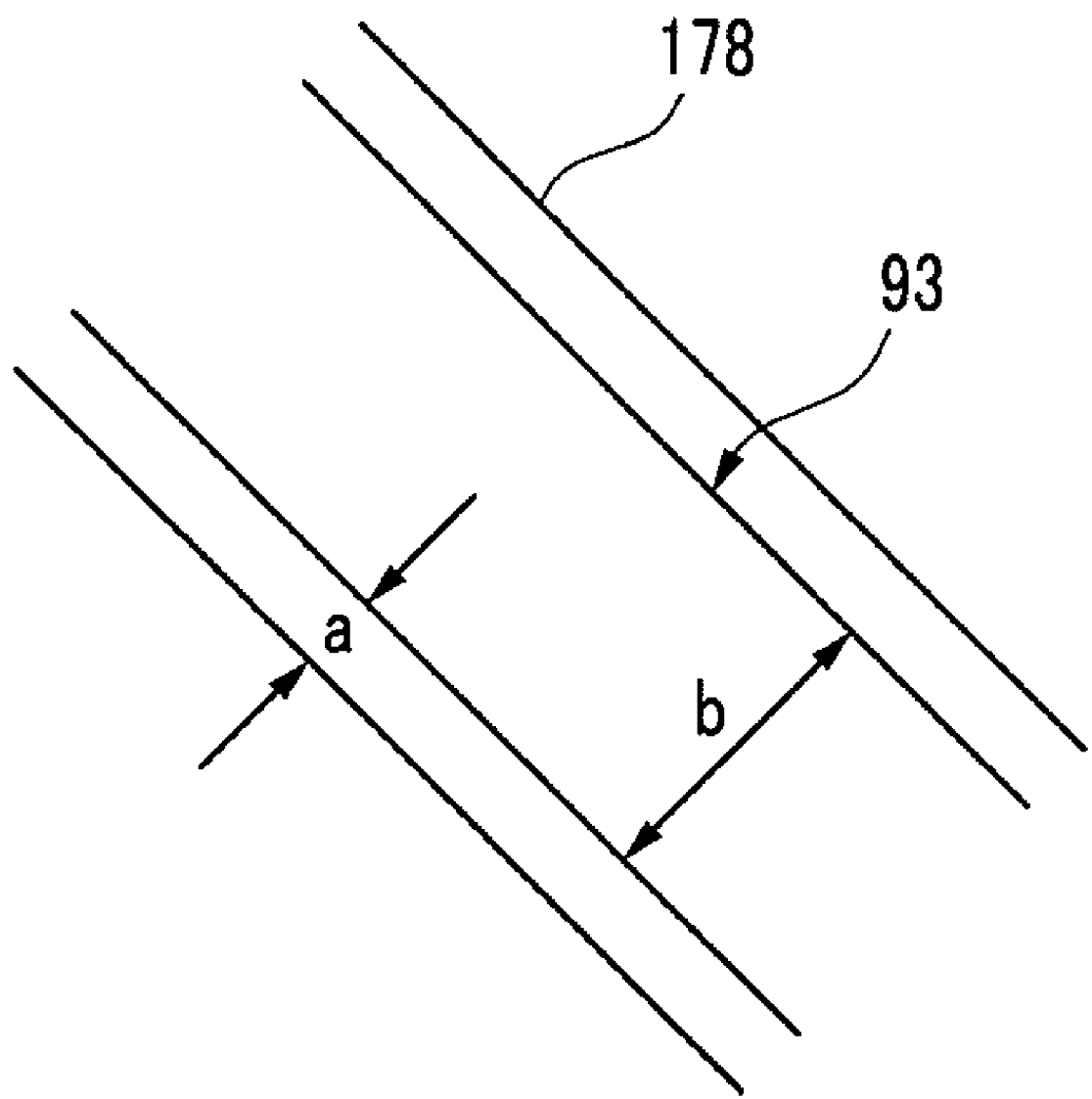
FIG. 5 is a magnified view of the A portion of the liquid crystal display shown in FIG. 3.

FIG. 3 is a layout view of a liquid crystal display according to an exemplary embodiment of the present invention, FIG. 4 is a cross-sectional view of the liquid crystal display shown in FIG. 3 taken along the IV-IV' line thereof, and FIG. 5 is a magnified view of the A portion of FIG. 3.

Referring to FIG. 3 and FIG. 4, a liquid crystal panel assembly according to an exemplary embodiment of the present invention includes the lower panel 100, the upper panel 200, the liquid crystal layer 3, and polarizers 12 and 22.

The lower panel 100 will be first described in detail.

A plurality of gate lines 121 are formed on an insulation substrate 110 based on transparent glass or plastic.

The gate lines 121 are aligned mainly in the horizontal direction. The respective gate lines 121 include a plurality of gate electrodes 124, and a wide end portion 129 that is connected with other layers or the gate driver 400. Although not shown in the drawings, the lower panel 100 may include storage electrode lines with storage electrodes, and the storage electrode lines may be formed on the same plane as the gate line 121. The gate lines 121 may be formed with a material having low resistivity and high conductivity, such as aluminum (Al), silver (Ag), chromium (Cr), and/or alloys thereof. Alternatively, the gate lines 121 may be formed with various other metals or conductors.

A gate insulating layer 140 is formed on the gate lines 121 with silicon nitride (SiNx) or silicon oxide (SiOx).

A plurality of semiconductor islands 154 are formed on the gate insulating layers 140 of hydrogenated amorphous silicon (abbreviated as a-Si) or polysilicon.

A plurality of ohmic contact islands 163 and 165 are formed on the semiconductor islands 154. The ohmic contacts 163 and 165 may be formed with a material such as n+ hydrogenated amorphous silicon where an n-type impurity of phosphorus or the like is doped at a high concentration, or of silicide. The ohmic contact islands 163 and 165 are disposed on the semiconductor islands 154 in pairs.

A plurality of data lines 171, a plurality of drain electrodes 175, and a plurality of auxiliary electrodes 178 are formed on the ohmic contacts 163 and 165, and on the gate insulating layer 140.

The data lines 171 carry data voltages, and are aligned mainly in the vertical direction such that they cross the gate lines 121. The respective data lines 171 include a plurality of source electrodes 173 extended toward the gate electrodes 124, and a wide end portion 179 that are be connected with other layers or an external driving circuit. A data driving circuit (not shown) for generating the data voltages may be mounted on a flexible printed circuit film (not shown) attached onto the insulation substrate 110. The data driving circuit may also be mounted on the insulation substrate 110 directly, or integrated with the insulation substrate 110. When the data driving circuit is integrated with the insulation substrate 110, the data lines may extend so as to be directly connected thereto.

The drain electrode 175 is separated from the data line 171 such that it faces the source electrode 173 around the gate electrode 124. The respective drain electrodes 175 have a one-side wide end portion and an opposite-side bar-shaped end portion. The bar-shaped end portion thereof is partially surrounded by a bent source electrode 173.

One gate electrode 124, one source electrode 173, and one drain electrode 175 form a thin film transistor (TFT) in association with the semiconductor islands 154, and the channel of the thin film transistor is formed at the semiconductor islands 154 between the source and drain electrodes 173 and 175.

The plurality of auxiliary electrodes 178 are electrically connected to each other and receive the same voltage from the auxiliary electrode driver 700. The voltage application of the auxiliary electrode driver 700 to the auxiliary electrodes 178 is performed only during the period of initial alignment of the liquid crystal layer, but no voltages are applied thereto during the period of image display of the liquid crystal display. According to an exemplary embodiment of the present invention, a plurality of auxiliary electrodes 178 are electrically connected to each other and receive the same voltage. Alternatively, the auxiliary electrodes 178 within pixels may receive different voltages depending upon the location of the respective pixels.

The data lines 171, the drain electrodes 175, and the auxiliary electrodes 178 may be formed with a material having low resistivity and high conductivity, such as aluminum (Al), silver (Ag), chromium (Cr), and/or alloys thereof. Alternatively, the data lines 171, the drain electrodes 175, and the auxiliary electrodes 178 may be formed with various other metals or conductors. Furthermore, the auxiliary electrodes 178 may be formed with a transparent conductive material.

The ohmic contacts 163 and 165 may exist between the underlying semiconductor islands 154 and the overlying data lines 171 and drain electrodes 175 and may lower the contact resistance therebetween. There are exposed portions in the semiconductor islands 154, including the portion thereof between the source and drain electrodes 173 and 175, which are not covered by the data lines 171 and the drain electrodes 175.

A passivation layer 180 is formed on the data lines 171, the drain electrodes 175, and the exposed portions of the semiconductor islands 154. The passivation layer 180 may be formed with an organic insulator, and may have a flat surface. The organic insulator may have photosensitivity, and the dielectric constant thereof may be about 4.0 or less. However, the passivation layer 180 may have a dual-layer structure with a lower inorganic layer and an upper organic layer such that the excellent insulating characteristic of an inorganic insulator or an organic film may be preserved while not causing damage to the exposed portions of the semiconductors 151.

A plurality of contact holes 182 and 185 are formed at the passivation layer 180 such that they expose the end portions 179 of the data lines 171 and the drain electrodes 175, respectively. A plurality of contact holes 181 are formed at the passivation layer 180 and the gate insulating layer 140 such that they expose the end portions 129 of the gate lines 121.

A plurality of pixel electrodes 191 and a plurality of contact assistants 81 and 82 are formed on the passivation layer 180. The pixel electrodes 191 and the contact assistants 81 and 82 may be formed with a transparent conductive material such as ITO and IZO, or a reflective metal such as aluminum, silver, chromium, and/or alloys thereof.

Each pixel electrode 191 is physically and electrically connected to a drain electrode 175 through a contact hole 185 and receives the data voltage from a drain electrode 175. The pixel electrode 191 receiving the data voltage generates an electric field in association with the common electrode 270 of the upper panel 200 receiving the common voltage, thereby determining the direction of liquid crystal molecules 31 of the liquid crystal layer 3 between the two electrodes 191 and 270. The polarization of light passing through the liquid crystal layer 3 is differentiated depending upon the direction of the liquid crystal molecules determined in such a way. The pixel electrode 191 and the common electrode 270 form a capacitor (referred to hereinafter as the "liquid crystal capacitor") and maintain the voltage applied thereto even after the thin film transistor turns off.

The respective pixel electrodes 191 have an approximate quadrangular shape, in which the longer two sides thereof are aligned substantially parallel to the gate lines 121 or the data lines 171. Some edges of the pixel electrodes 191 may be chamfered. The chamfered oblique side of the pixel electrode 191 is angled to the gate line 121 at about 45°.

A central cutout 93, lower cutouts 94a and 95a, and upper cutouts 94b and 95b are formed at the pixel electrode 191, and the pixel electrode 191 is partitioned into a plurality of regions by the cutouts 93, 94a, 95a, 94b, and 95b. The cutouts 93, 94a, 95a, 94b, and 95b are substantially reverse-symmetrical to each other with respect to an imaginary horizontal center line bisecting the pixel electrode 191. Some of the cutouts 93, 95a, and 95b of the pixel electrode 191 are overlapped with the auxiliary electrode 178. When the liquid crystal display is viewed from the top side, the auxiliary electrode 178 and the cutouts 93, 95a, and 95b are disposed such that the auxiliary electrode 178 is partially exposed through those cutouts 93, 95a, and 95b.

The lower cutouts 94a and 95a and the upper cutouts 94b and 95b are roughly aligned from the left side of the pixel electrode 191 to the right side thereof obliquely, and are placed at the lower half and the upper half of the pixel electrode 191 with respect to the horizontal center line thereof, respectively. The lower cutouts 94a and 95a and the upper cutouts 94b and 95b are aligned perpendicular to each other while angled to the gate line 121 at about 45°.

The central cutout 93 has a pair of oblique sides that are aligned substantially parallel to the lower cutouts 94a and 95a and the upper cutouts 94b and 95b, respectively.

Accordingly, the lower half of the pixel electrode 191 is partitioned into four regions by the lower oblique side of the central cutout 93 and the lower cutouts 94a and 95a, while the upper half thereof is partitioned into four regions by the upper oblique side of the central cutout 93 and the upper cutouts 94b and 95b. The direction of the liquid crystal molecules is differentiated at the both-side domains around the cutouts 93, 94a, 95a, 94b, and 95b under the application of an electric field. In this case, the number of partitioned regions or cutouts may be differentiated depending upon design factors, including the size of the pixel electrode 191, the length ratio of the horizontal side of the pixel electrode 191 to the vertical side thereof, and the kind or characteristic of the liquid crystal layer 3.

The cutouts 93, 94a, 95a, 94b, and 95b may be replaced by protrusions or concavities.

Referring to FIG. 3, the auxiliary electrode 178 is similar in shape to some (93, 95a, and 95b) of the cutouts 93, 94a, 95a, 94b, and 95b of the pixel electrode 191, and is disposed thereunder such that it is overlapped with the latter by interposing the passivation layer 180. Although the auxiliary electrode 178 is shown to be disposed under only some (93, 95a, and 95b) of the cutouts 93, 94a, 95a, 94b, and 95b of the pixel electrode 191, the present invention is not limited thereto in that the auxiliary electrode 178 may be disposed under all of the cutouts of the pixel electrode 191.

Furthermore, the auxiliary electrode 178 is larger in width than the cutouts 93, 95a, and 95b of the pixel electrode 191, and hence is partially overlapped with the pixel electrode 191. This structure will be described in detail with reference to FIG. 5. FIG. 5 is a magnified view of the A portion of FIG. 3.

Referring to FIG. 5, the width b of the cutout 93 of the pixel electrode 191 may be about 3.5 μm to 4.5 μm, and the auxiliary electrode 178 may be, on either side thereof, about 1.5 μm to 2.5 μm larger than the cutout 93 of the pixel electrode 191 such that the width of the overlapped region a between the auxiliary electrode 178 and the pixel electrode 191 could be about 1.5 μm to 2.5 μm. Generally, the width b of the cutout 93 of the pixel electrode 191 is about 6 μm, and the width of the overlapped region between the pixel electrode 191 and the underlying other electrode may be about 1 μm. In the liquid crystal display according to an exemplary embodiment of the present invention, the width b of the cutout of the pixel electrode 191 is relatively small, and the width of the overlapped region a between the auxiliary electrode 178 and the pixel electrode 191 is relatively large.

The contact assistants 81 and 82 are connected to the end portion 129 of the gate line 121 and the end portion 179 of the data line 171 through the contact holes 181 and 182, respectively. The contact assistants 81 and 82 assist the adhesion of the end portion 129 of the gate line 121 and the end portion 179 of the data line 171 to an outer device and protect them.

A common electrode panel 200 will be described in detail with reference to FIG. 3 and FIG. 4. A light blocking member 220 is formed on an insulation substrate 210 including transparent glass or plastic. The light blocking member 220, also called a black matrix, defines a plurality of opening regions facing the pixel electrodes 191 and blocks the leakage of light between the pixel electrodes 191.

A plurality of color filters 230 are formed on the substrate 210 such that they are disposed substantially within the opening regions surrounded by the light blocking member 220. Each color filter 230 is longitudinally aligned along a pixel electrode 191 in the vertical direction and forms a stripe shape. The respective color filters 230 may display one of three primary colors of red, green, and blue.

An overcoat 250 is formed on the color filters 230 and the light blocking member 220. The overcoat 250 may be formed with an insulating material, for example, an organic insulating material. The overcoat 250 prevents the color filters 230 from being exposed and provides a flat surface. The overcoat 250 may be omitted.

A common electrode 270 is formed on the overcoat 250. The common electrode 270 does not require cutouts and accordingly the common electrode 270 has a continuous surface. Furthermore, no protrusions are needed with the common electrode 270. The common electrode 270 may be formed with a transparent conductor such as ITO and IZO.

Alignment layers 11 and 21 are coated on the inner surfaces of the display panels 100 and 200 to align the liquid crystal layer 3. The alignment layers 11 and 21 are photo-aligned. The alignment layers 11 and 21 may be vertical alignment layers. The alignment layers 11 and 21 may contain polyimide (PI). Polarizers 12 and 22 are attached to the outer surfaces of the display panels 100 and 200.

The liquid crystal display may include a backlight unit (not shown) for giving light to the polarizers 12 and 22, the display panels 100 and 200, and the liquid crystal layer 3.

The liquid crystal layer 3 interposed between the lower and the upper panels 100 and 200 contains liquid crystal molecules 31 having negative dielectric anisotropy, and polymers (not shown). The liquid crystal molecules 31 are pre-tilted by the polymers such that the directors thereof stand substantially vertical to the length direction of the cutouts 93, 94a, 95a, 94b, and 95b of the pixel electrode 191, and are aligned with no application of an electric field such that the directors thereof stand vertically with respect to the surface of the two display panels 100 and 200. The respective pixels have a plurality of sub-regions differentiated in the pre-tilt direction of the liquid crystal molecules 31 by the cutouts 93, 94a, 95a, 94b, and 95b of the pixel electrode 191. However, the sub-regions of the pixel may be differentiated depending upon design factors, including the length ratio of the horizontal side of the pixel electrode 191 to the vertical side thereof, and the kind or characteristic of the liquid crystal layer 3.

A method of initially aligning the liquid crystal molecules 31 such that they are pre-tilted will be described in detail with reference to FIG. 6A to FIG. 6D. FIG. 6A to FIG. 6D illustrate a process of making the liquid crystal molecules be pre-tilted according to an exemplary embodiment of the present invention.

Figure 6A:
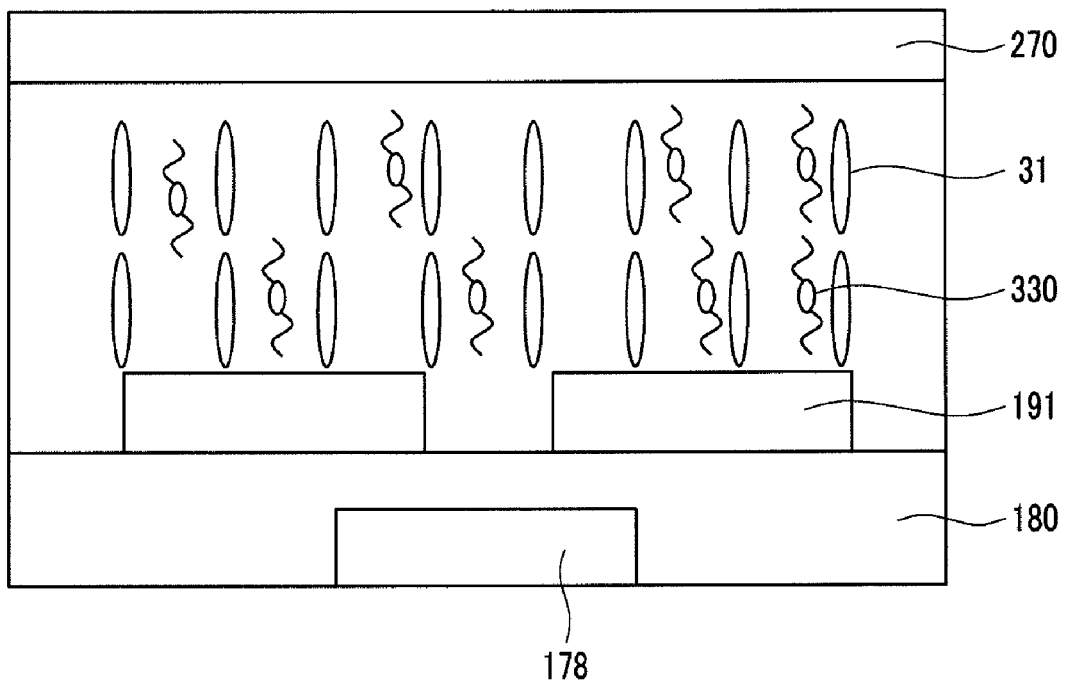
FIG. 6A to FIG. 6D illustrate the process of causing the liquid crystal molecules to be pre-tilted according to an exemplary embodiment of the present invention.

As shown FIG. 6A, a pre-polymer 330 is first injected between the two display panels 100 and 200 together with a liquid crystal material. The pre-polymer is a monomer that may be hardened through polymerization using ultraviolet light. The pre-polymer 330 may be a reactive mesogen that is polymerized by ultraviolet light. The directors 31 of the liquid crystal molecules stand vertical with respect to the surface of the two display panels 100 and 200 in the absence of an electric field.

Figure 6B:
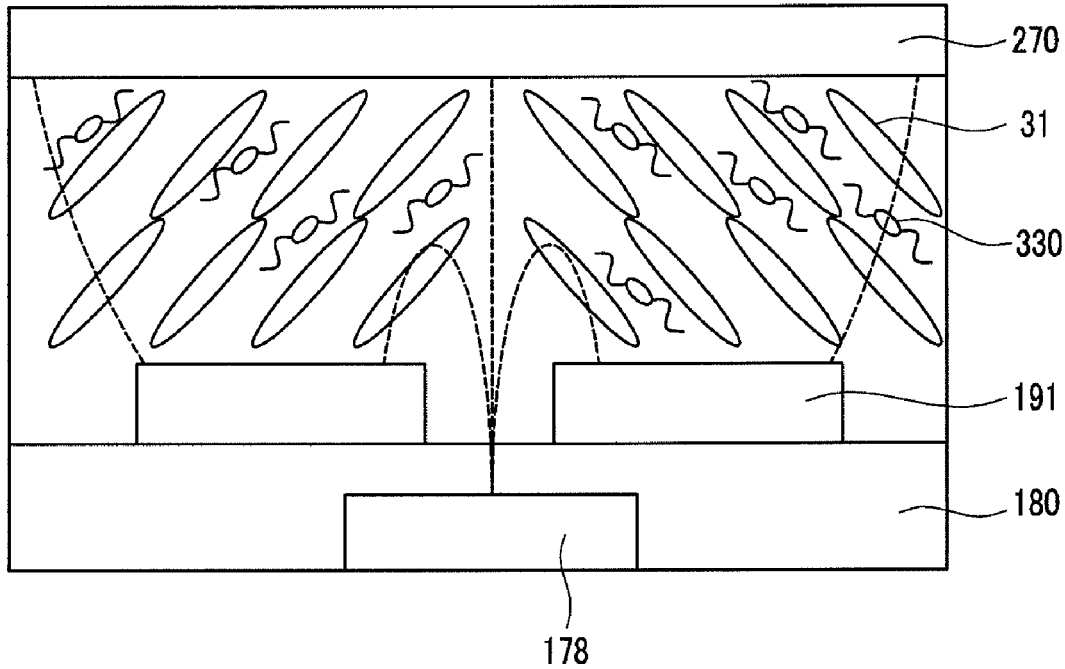

When, as shown in FIG. 6B, predetermined voltages are applied to the pixel electrodes 191, the common electrode 270, and the auxiliary electrodes 178 generate an electric field over the liquid crystal layer 3 between the two display panels 100 and 200. In this case, the voltage applied to the pixel electrode 191 exceeds the threshold voltage of the thin film transistor of the liquid crystal display. Furthermore, the voltages applied to the respective electrodes are sequentially increased from the voltage applied to the common electrode 270, the voltage applied to the pixel electrodes 191, and the voltage applied to the auxiliary electrodes 178. The voltage applied to the auxiliary electrodes 178 may be about two times greater than the voltage applied to the pixel electrode 191.

Accordingly, when the voltages are applied to the pixel electrodes 191, the common electrode 270, and the auxiliary electrodes 178, the cutouts 93, 94a, 95a, 94b, and 95a and the sides of the pixel electrode 191 distort the electric field to thereby make a horizontal component for determining the pre-tilt direction of the liquid crystal molecules. The horizontal component of the primary electric field is aligned substantially vertical to the sides of the cutouts 93, 94a, 95a, 94b, and 95a and the pixel electrode 191, and is directed toward the inside or the outside of the pixel electrode 191 depending upon the polarity of the voltage of the pixel electrode 191. When the voltage of the pixel electrode 191 is greater than the voltage of the common electrode 270, the horizontal component is directed toward the outside of the pixel electrode 191. In FIG. 6B, the electric field is indicated by a dotted line. Furthermore, the voltage difference is also formed between the auxiliary electrode 178 and the pixel electrode 191 so as to generate a secondary electric field. The secondary electric field has a horizontal component that is substantially parallel to the horizontal component of the primary electric field. When the voltage of the auxiliary electrode 178 is greater than the voltage of the pixel electrode 191 with respect to the voltage of the common electrode 270, the strength of the horizontal component of the secondary electric field is greater than the horizontal component of the primary electric field. Therefore, the pure horizontal component of the electric field at the cutouts 93, 95a and 95b overlapped with the auxiliary electrode 178 has the same direction as the horizontal component at the remaining cutouts 94a and 94b neighboring thereto or at the sides of the pixel electrode 191. The liquid crystal molecules 31 are stably arranged without colliding against each other, under the influence of a greater electric field due to the auxiliary electrode 178.

As described above, the cutouts 93, 94a, 95a, 94b, and 95b partition the pixel electrode 191 into a plurality of regions, and the plurality of regions each have two major sides that are parallel to each other. As the liquid crystal molecules at each region mostly stand vertical to the main sides of the region and are influenced by the horizontal component of the electric field with the above-described direction, the liquid crystal molecules may be tilted in a plurality of different directions. Accordingly, when the liquid crystal molecules are tilted in various directions, the reference viewing angle of the liquid crystal display becomes widened.

As described above, when predetermined voltages are applied to the pixel electrodes 191, the common electrode 270, and the auxiliary electrodes 178 to thereby generate an electric field over the liquid crystal layer 3 between the two display panels 100 and 200, the liquid crystal molecules 31 of the liquid crystal layer 3 are tilted in a plurality of directions in response to the electric field.

Figure 6C:
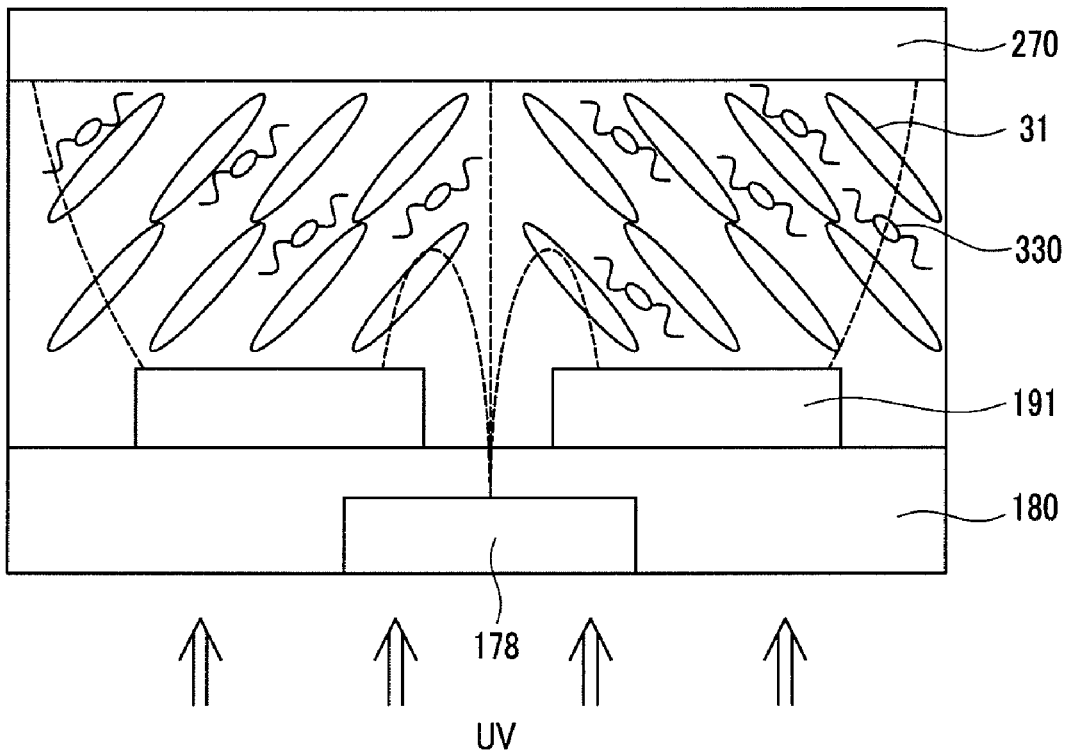
Figure 6D:
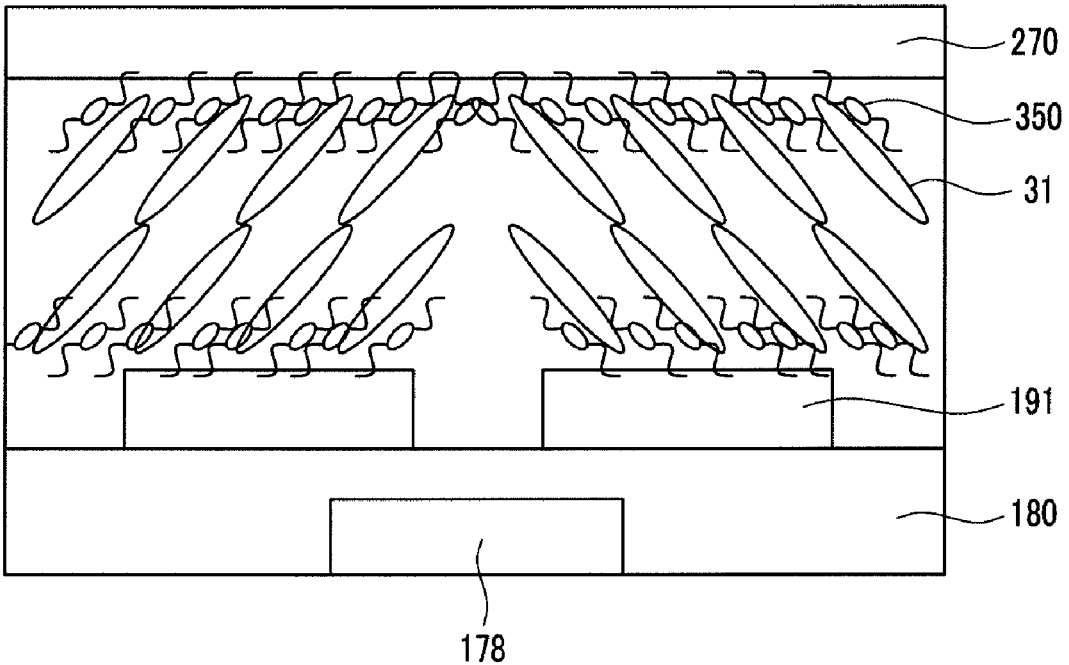

As shown in FIG. 6C, when predetermined voltages are applied to the pixel electrodes 191, the common electrode 270, and the auxiliary electrodes 178 and the liquid crystal molecules 31 of the liquid crystal layer 3 are tilted in a plurality of directions, the ultraviolet light is illuminated thereto. With the illumination of ultraviolet light, the pre-polymer 330 is polymerized to thereby form a polymer 350, as shown in FIG. 6D. Particularly, the polymers 350 are formed in contact with the display panels 100 and 200. The alignment direction of the liquid crystal molecules 31 is determined by the polymers 350 such that the liquid crystal molecules 31 are pre-tilted in a plurality of directions, as described above. As the liquid crystal molecules 31 are pre-tilted, the response speed of the liquid crystal display can be increased.

Consequently, the liquid crystal molecules 31 are pre-tilted in a plurality of different directions even when no voltage is applied to the electric field generating electrodes 191 and 270.

As described earlier, the auxiliary electrode 178 receives a predetermined voltage during the period of initially aligning the liquid crystal layer 3, but is floated during the period of image display of the liquid crystal display such that no voltages are applied thereto.

A display operation of a liquid crystal display according to an exemplary embodiment of the present invention will be described with reference to FIG. 7A and FIG. 7B.

Figure 7:
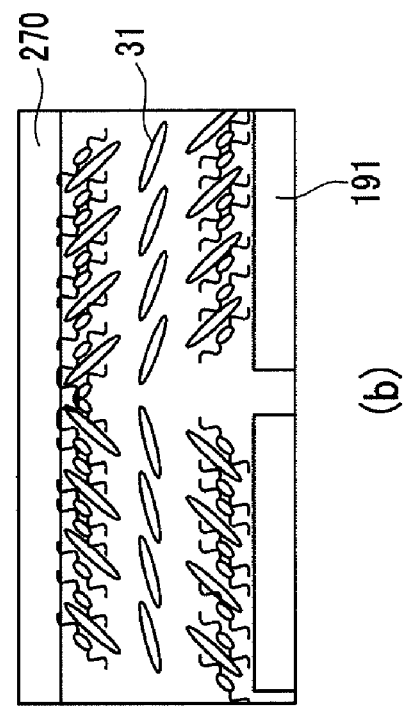
FIG. 7A and FIG. 7B illustrate the movements of liquid crystal molecules according to an exemplary embodiment of the present invention.
Figure 7:
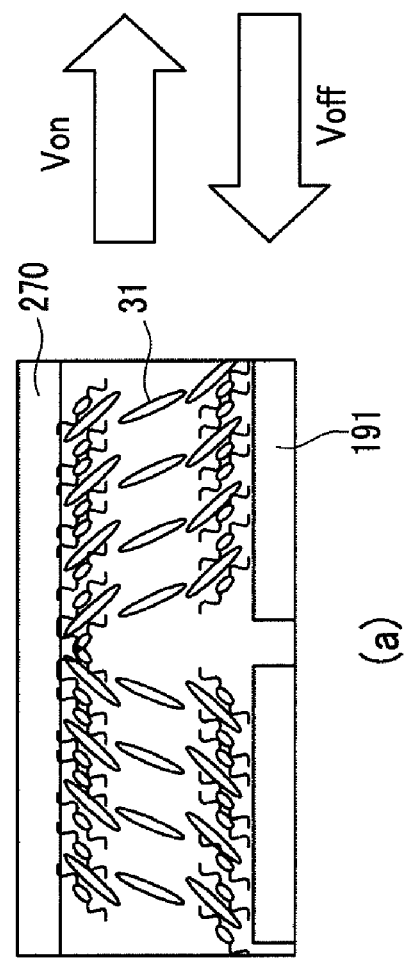

As shown in FIG. 7A, the liquid crystal molecules 31 are aligned with no application of a gate signal to the gate line 121 such that they are pre-tilted by the polymers, and the directors thereof stand vertical to the surface of the two electrodes 191 and 270. When the gate signal is applied to the gate line 121 Von, the data voltage is applied to the pixel electrode 191 via the data line 171. Then, the pixel electrode 191 receiving the data voltage generates an electric field over the liquid crystal layer 3 in association with the common electrode 270 receiving the common voltage. The liquid crystal molecules 31 of the liquid crystal layer 3 then change direction in response to the electric field such that the directors thereof stand vertical to the direction of the electric field. At this time, as shown in FIG. 7B, the liquid crystal molecules 31 are tilted in accordance with the pre-tilt direction.

As described earlier, the respective pixels have a plurality of sub-regions differentiated in the pre-tilt direction of the liquid crystal molecules 31, and hence, the tilt direction of the liquid crystal molecules 31 is differentiated per the respective sub-regions of each pixel. With a liquid crystal display according to an exemplary embodiment of the present invention, an auxiliary electrode 178 is formed under some (93, 95a and 95b) of the cutouts 93, 94a, 95a, 94b, and 95b of the pixel electrode 191 without forming any cutouts or protrusions at the common electrode 270, thereby partitioning the respective pixels into a plurality of sub-regions with an effect similar to that of the cutouts or protrusions that would otherwise be formed at the common electrode 270. Accordingly, when the liquid crystal molecules 31 are tilted in various directions, the reference viewing angle of the liquid crystal display becomes widened.

Meanwhile, as described above, the auxiliary electrode 178 receives a predetermined voltage during the period of initially aligning the liquid crystal layer 3, and is floated during the period of image displaying of the liquid crystal display such that no voltages are applied thereto. During the period of image displaying of the liquid crystal display, the auxiliary electrode 178 is partially overlapped with the pixel electrode 191 so that a weak electric field is generated between the auxiliary electrode 178 and the common electrode 270 as well as between the auxiliary electrode 178 and the pixel electrode 191. The direction of the weak electric field may be opposite to that of the electric field influencing the liquid crystal molecules at other regions. Accordingly, the liquid crystal molecules around the auxiliary electrode 178 may be unstable due to the weak electric field.

The magnitude of the voltage induced to the auxiliary electrode is computed by the following formula.

$$V_{floating} = V_{pixel} \times \frac{C_{cp}}{C_{cp} + C_{lc}}$$

In the above formula, $V_{floating}$ is the voltage induced to the auxiliary electrode 178, $V_{pixel}$ the voltage applied to the pixel electrode 191, $C_{cp}$ the capacity stored between the pixel electrode 191 and the auxiliary electrode 178, and $C_{lc}$ the capacity stored at the liquid crystal layer between the common electrode 270 and the auxiliary electrode 178. The liquid crystal molecules near the weak electric field of the auxiliary electrode 178 may be unstable.

However, as described above, with a liquid crystal display according to an exemplary embodiment of the present invention, the widths of the cutouts of the pixel electrode 191 are relatively small, and the width of the overlapped region between the auxiliary electrode 178 and the pixel electrode 191 is relatively large, compared to those of the common liquid crystal display. Therefore, as the overlapped region between the auxiliary electrode 178 and the pixel electrode 191 has a large width, the capacitance $C_{cp}$ stored between the auxiliary electrode 178 and the pixel electrode 191 is increased. Consequently, the voltage $V_{floating}$ induced to the auxiliary electrode 178 is increased so that the potential difference between the auxiliary electrode 178 and the pixel electrode 191 is reduced, and as a result, the electric fields generated between the auxiliary electrode 178 and the common electrode 270 as well as between the auxiliary electrode 178 and the pixel electrode 191 become decreased in magnitude. Accordingly, with a liquid crystal display according to an exemplary embodiment of the present invention, the electric fields between the auxiliary electrode 178 and the common electrode 270 as well as between the auxiliary electrode 178 and the pixel electrode 191 are reduced in magnitude, and hence the liquid crystal molecules around the auxiliary electrode 178 do not become unstable.

Figure 8:
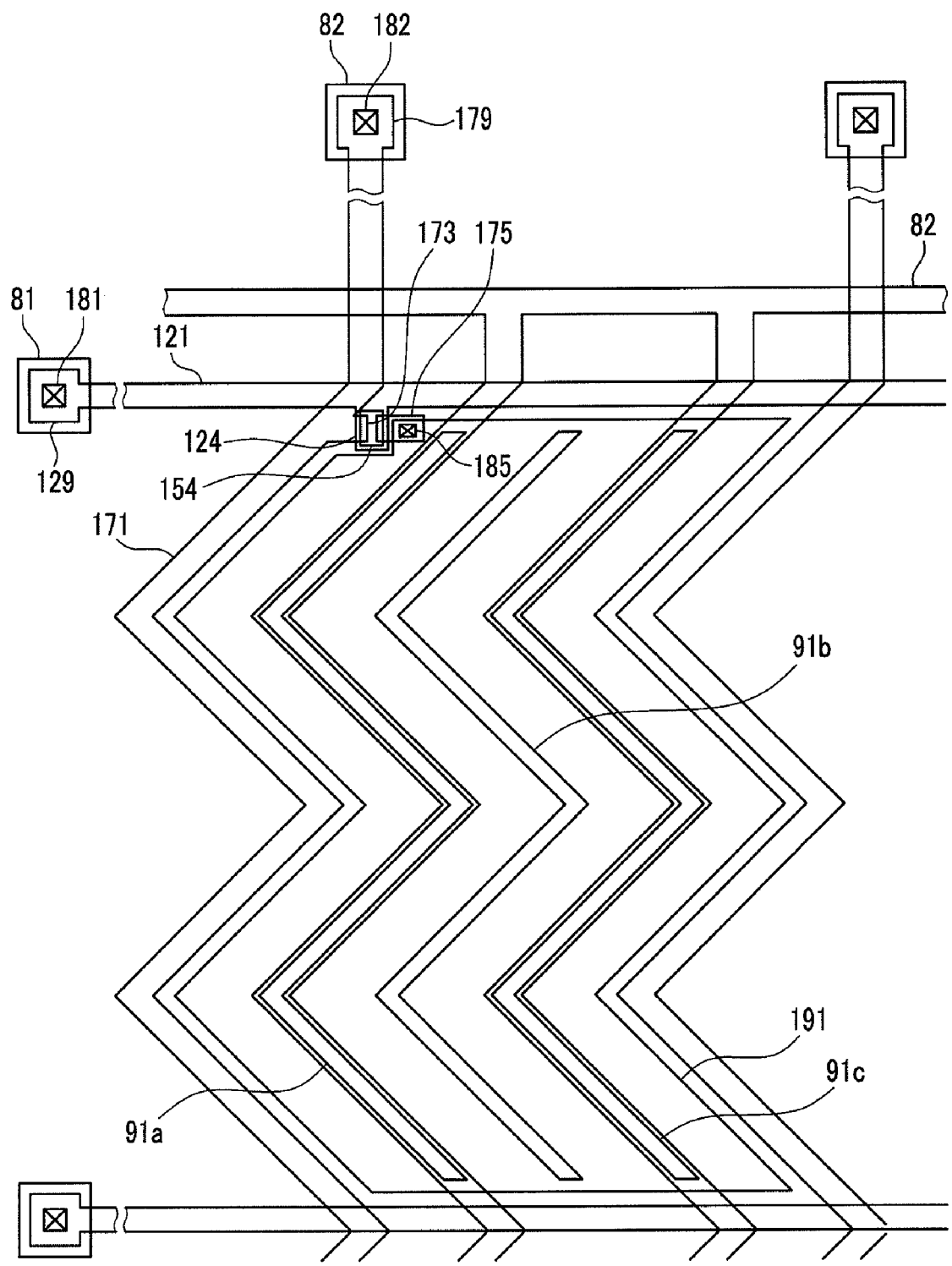
FIG. 8 is a layout view of a thin film transistor array panel of a liquid crystal display according to an exemplary embodiment of the present invention.
Figure 9:
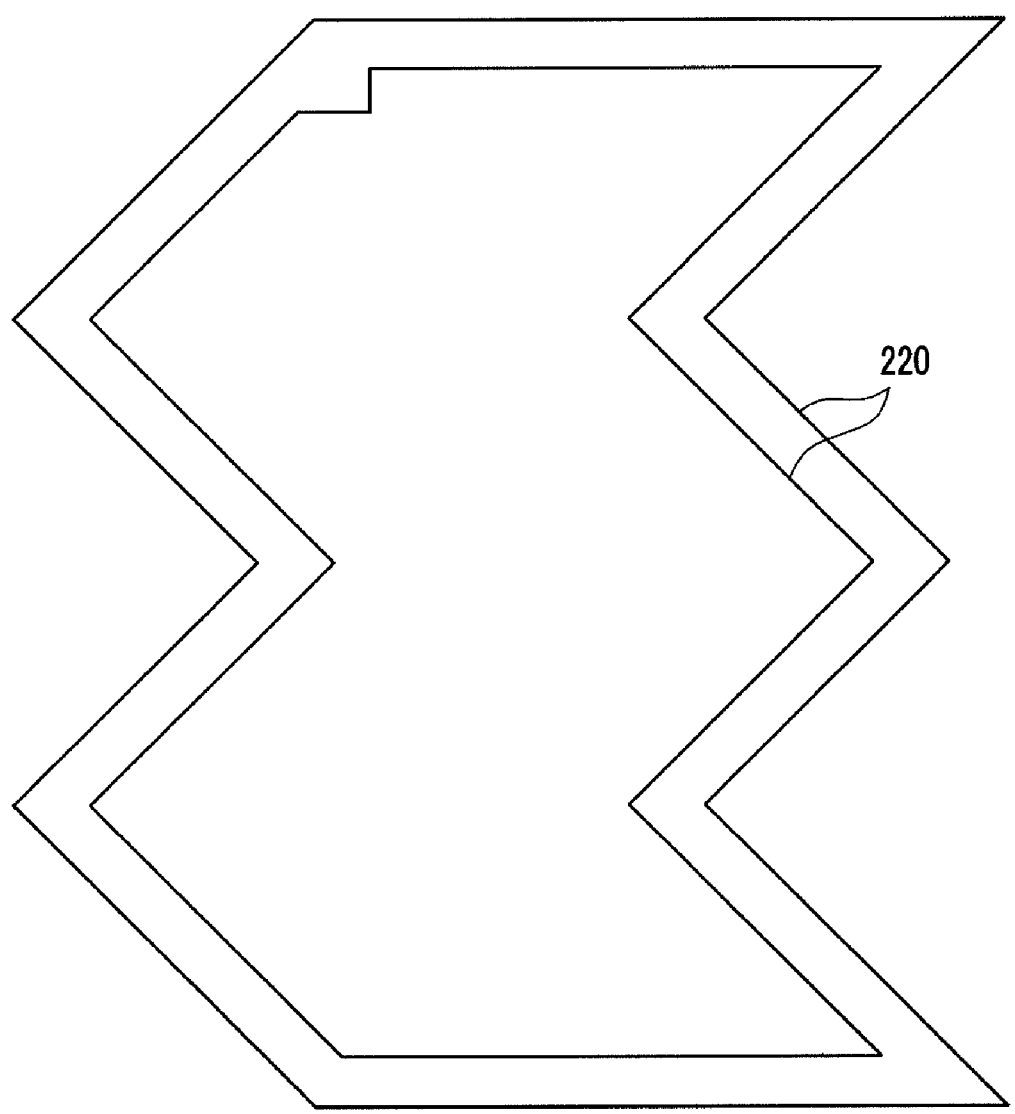
FIG. 9 is a layout view of a common electrode panel of a liquid crystal display according to an exemplary embodiment of the present invention.
Figure 10:
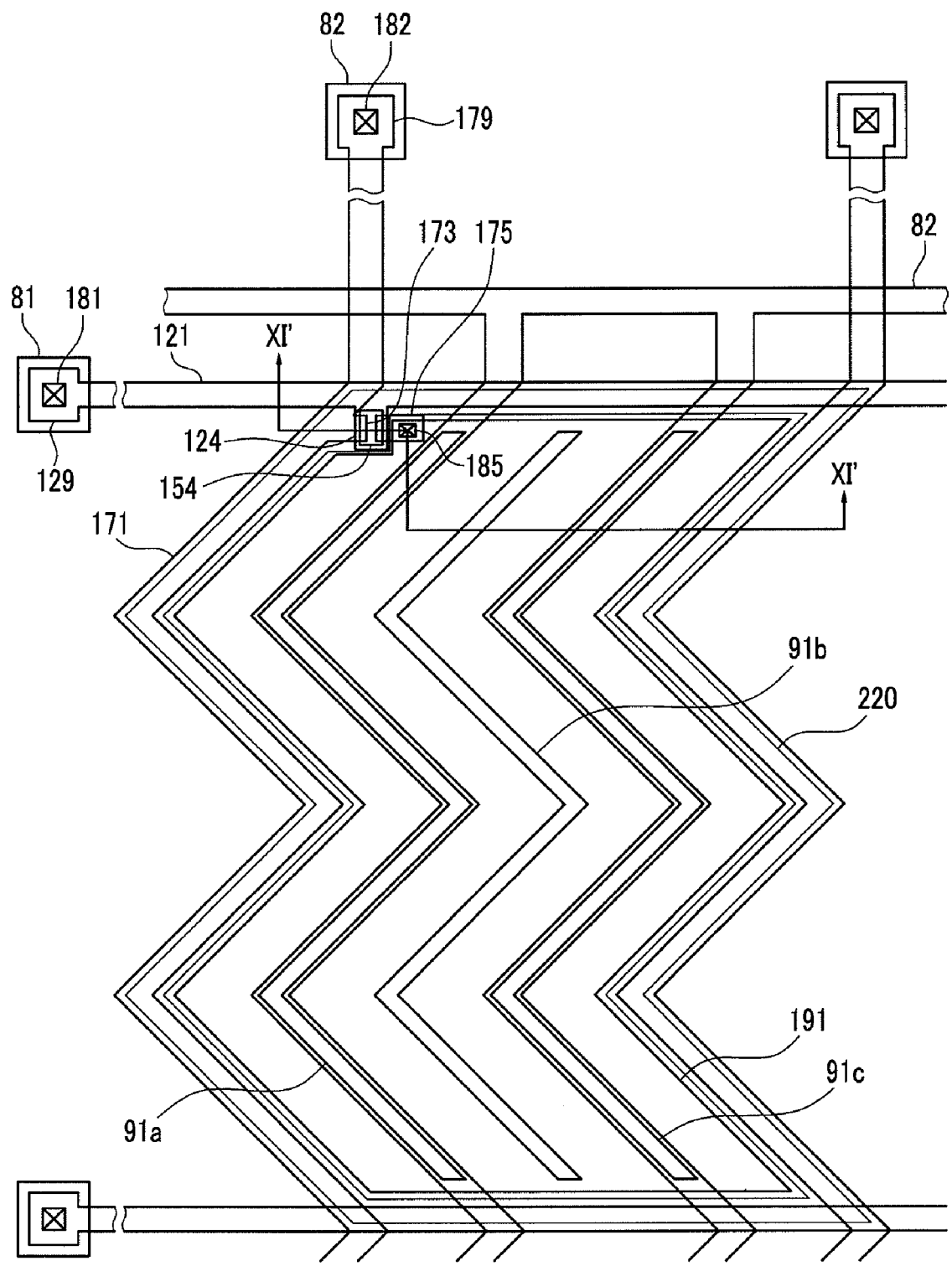
FIG. 10 is a layout view of a liquid crystal display with the thin film transistor array panel shown in FIG. 8, and the common electrode panel shown in FIG. 9.
Figure 11:
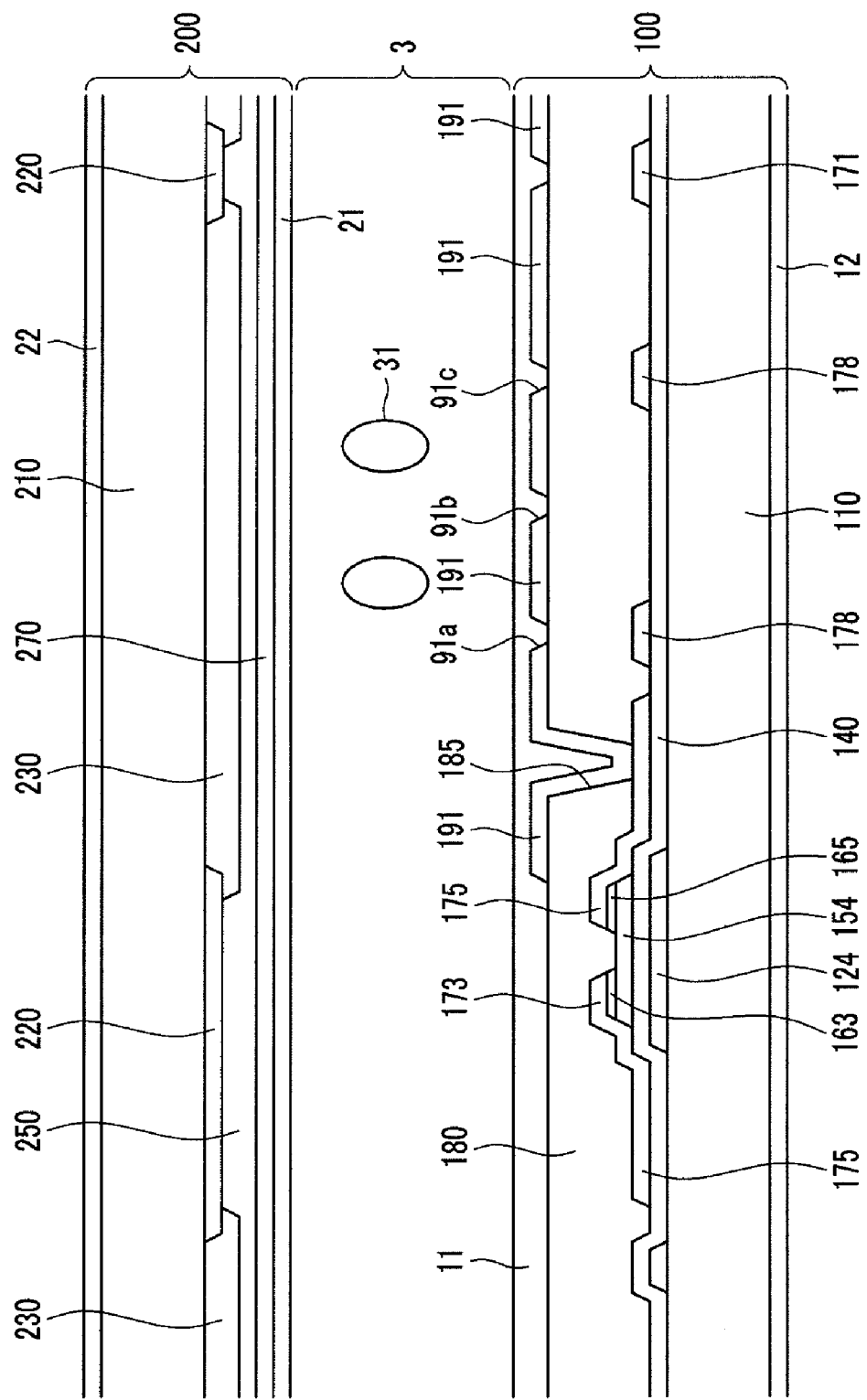
FIG. 11 is a cross-sectional view of the liquid crystal display shown in FIG. 10 taken along the XI'-XI' line thereof.

A liquid crystal display according to an exemplary embodiment of the present invention will be described in detail with reference to FIG. 8 to FIG. 11. FIG. 8 is a layout view of a thin film transistor array panel of a liquid crystal display according to an exemplary embodiment of the present invention, FIG. 9 is a layout view of a common electrode panel of a liquid crystal display according to an exemplary embodiment of the present invention, FIG. 10 is a layout view of a liquid crystal display with the thin film transistor array panel shown in FIG. 8 and the common electrode panel shown in FIG. 9, and FIG. 11 is a cross-sectional view of the liquid crystal display shown in FIG. 10 taken along the XI'-XI' line thereof.

Referring to FIG. 8 to FIG. 11, a liquid crystal display according to an exemplary embodiment of the present invention includes a thin film transistor array panel 100 and a common electrode panel 200 facing each other, and a liquid crystal layer 3 interposed between the two display panels 100 and 200.

The layered structure of the thin film transistor array panel 100 is substantially the same as that shown in FIG. 3 and FIG. 4.

A plurality of gate lines 121 having a plurality of gate electrode 124 are formed on an insulation substrate 110. A gate insulating layer 140, a plurality of semiconductor islands 154, and a plurality of ohmic contact islands 163 and 165 are sequentially formed on the gate lines 121.

A plurality of data lines 171 having source electrodes 173, a plurality of drain electrodes 175, and a plurality of auxiliary electrode 178 are formed on the ohmic contacts 161 and 165, and overlaid with a passivation layer 180. A plurality of contact holes 181, 182, and 185 are formed at the gate insulating layer 140 and the passivation layer 180. A plurality of pixel electrodes 191 and a plurality of contact assistants 81 and 82 are formed on the passivation layer 180.

However, differing from the thin film transistor array pane shown in FIG. 3 and FIG. 4, the respective data lines 171 have a plurality of cyclically bent curved portions alternately connected to each other. The curved portion has two pairs of oblique-lined portions connected to each other in the form of a chevron. The oblique-lined portion is angled to the gate line 121 at about 45°. Furthermore, the respective pixel electrodes 191 have two pairs of curved sides that are substantially parallel to the curved portions of the data line 171, and a pair of horizontal sides are substantially parallel to the gate line 121, while being formed substantially in the shape of a chevron. A pair of the curved sides include a concave right side meeting the horizontal side at an acute angle, and a convex left side meeting the horizontal side at an obtuse angle.

The pixel electrodes 191 each have three cutouts 91a, 91b, and 91c. The cutouts 91a, 91b, and 91c have two pairs of curved sides that are substantially parallel to the curved portions of the data line 171 and a pair of horizontal sides that are substantially parallel to the gate line 121, while formed substantially in the shape of a chevron, like the pixel electrode 191. The respective pixels are partitioned into a plurality of regions by cutouts 91a, 91b, and 91c of the pixel electrode 191. The liquid crystal molecules are differentiated in alignment at both-side domains around the cutouts 91a, 91b, and 91c under the application of an electric field.

As with the previously-described exemplary embodiment shown in FIG. 3 and FIG. 4, the liquid crystal display may include auxiliary electrodes 178 each of which receives a predetermined voltage only during the period of initially aligning the liquid crystal layer and is floated during the period of image display of the liquid crystal display. The auxiliary electrode 178 is overlapped with one or more of the cutouts 91a and 91c of the pixel electrode 191. Furthermore, the auxiliary electrode 178 is greater in width than the cutouts 91a and 91c overlapped therewith, and hence, is partially overlapped with the pixel electrode 191. The width of the cutouts 91a, 91b, and 91c of the pixel electrode 191 may be about 3.5 µm to 4.5 µm. The auxiliary electrode 178 is, on either side thereof, may be about 1.5 µm to 2.5 µm larger than the cutout 93 of the pixel electrode 191 such that the width of the overlapped region between the auxiliary electrode 178 and the pixel electrode 191 could be about 1.5 µm to 2.5 µm.

A common electrode panel 200 will be described with reference to FIG. 9, FIG. 10 and FIG. 11.

The layered structure of the common electrode panel 200 according to an exemplary embodiment of the present invention may be substantially the same as the layered structure of the common electrode panel shown in FIG. 3 and FIG. 4.

A light blocking member 220 is formed on an insulation substrate 210, and a plurality of color filters 230 are formed on the substrate 210 and the light blocking member 220. An overcoat 250 is formed on the plurality of color filters 230 and the light blocking member 220. A common electrode 270 is formed on the overcoat 250. The common electrode 270 does not have any cutouts.

However, differing from the common electrode panel shown in FIG. 3 and FIG. 4, the light blocking member 220 has curved portions corresponding to the curved portions of the data lines 171 and triangular portions corresponding to the thin film transistors. The color filters 230 are primarily within the regions surrounded by the light blocking member 230, and extend along the row of pixel electrodes 191. The color filters 230 are curved.

Alignment layers 11 and 21 are coated on the inner surfaces of the display panels 100 and 200, and polarizers 12 and 22 are mounted on the outer surfaces of the display panels 100 and 200. The alignment layers 11 and 21 are photo-aligned.

The liquid crystal layer 3 includes liquid crystal molecules 31 having negative dielectric anisotropy, and polymers 350. The liquid crystal molecules 31 of the liquid crystal layer 3 are pre-tilted by the polymers 350 such that the directors thereof stand substantially vertical to the curved direction of the cutouts 91a to 91c of the pixel electrode 191 The liquid crystal molecules 31 of the liquid crystal layer 7 are aligned substantially vertically with respect to the surface of the two display panels 100 and 200 in the absence of an electric field. The respective pixels have a plurality of sub-regions within which the pre-tilt direction of the liquid crystal molecules is differentiated by the curved portions of the cutouts 91a to 91c, the curved sides of the pixel electrode 191, and the difference in the voltages applied to the auxiliary electrodes 178, the pixel electrodes 191, and common electrode 270 during the initial alignment period. However, the sub-regions of the pixel may be varied depending upon design factors, including the length ratio of the horizontal side of the pixel electrode 191 to the vertical side thereof, and the kind or characteristic of the liquid crystal layer 3.

Various features of the liquid crystal display shown in FIG. 3 and FIG. 4 may also be applied to the liquid crystal display shown in FIG. 8 to FIG. 11. Furthermore, the present invention is not limited to the previously-described exemplary embodiments, but may be applied to all vertical alignment liquid crystal displays having pixel electrodes with various structures of a chevron, a Z cell, a double Z cell, etc.

The operation characteristics of a liquid crystal display according to an exemplary embodiment of the present invention will be described in detail below.

Figure 12:
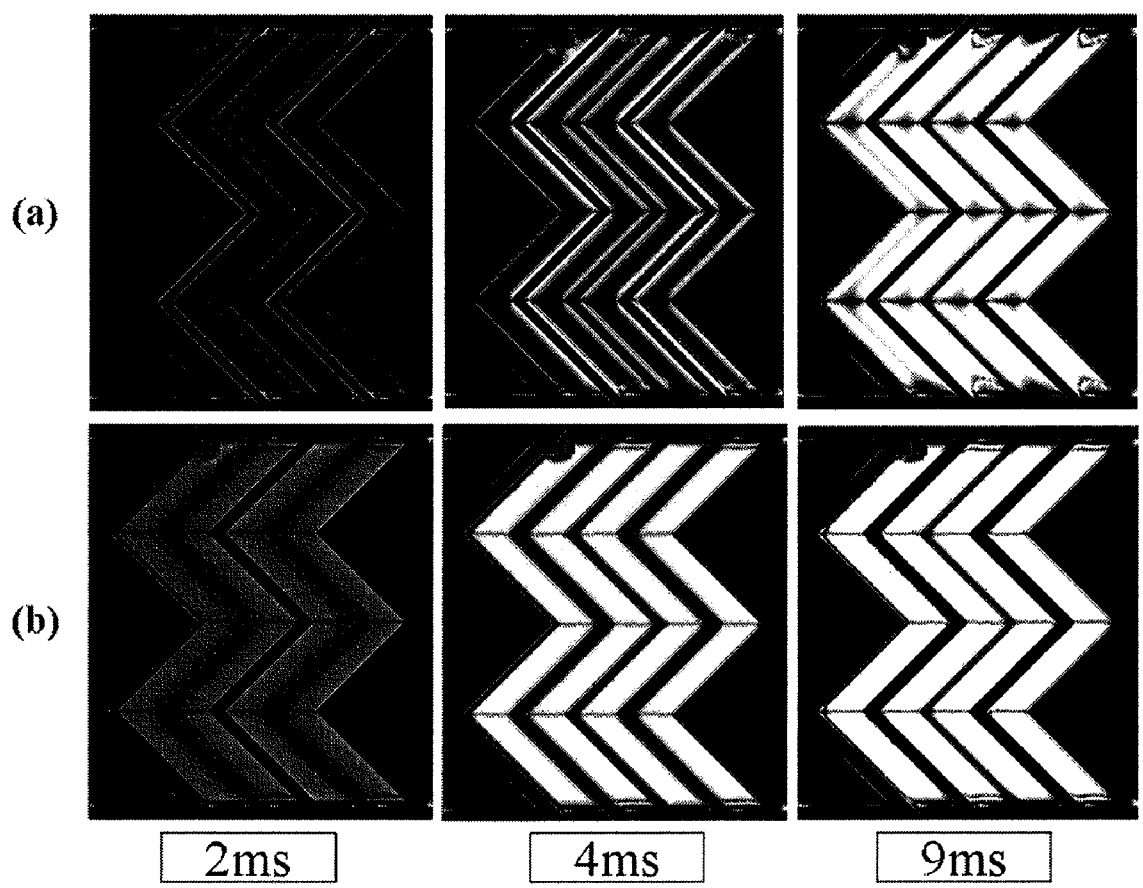
FIG. 12A and FIG. 12B are photographs illustrating the variation in luminance of a liquid crystal display according to an exemplary embodiment of the present invention.
Figure 13:
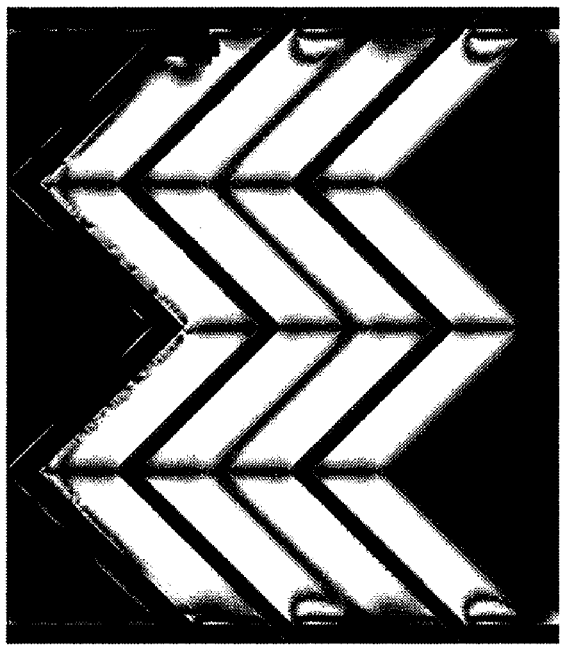
FIG. 13A and FIG. 13B are photographs illustrating the maximum luminance of a liquid crystal display according to an exemplary embodiment of the present invention.
Figure 13:
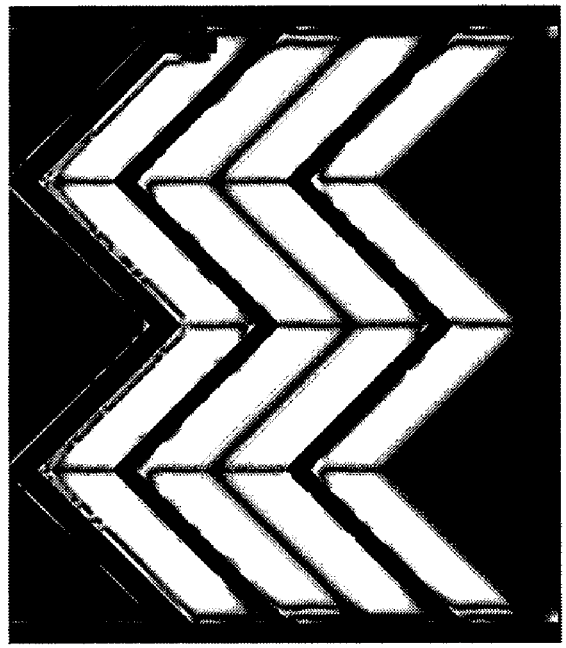
Figure 14:
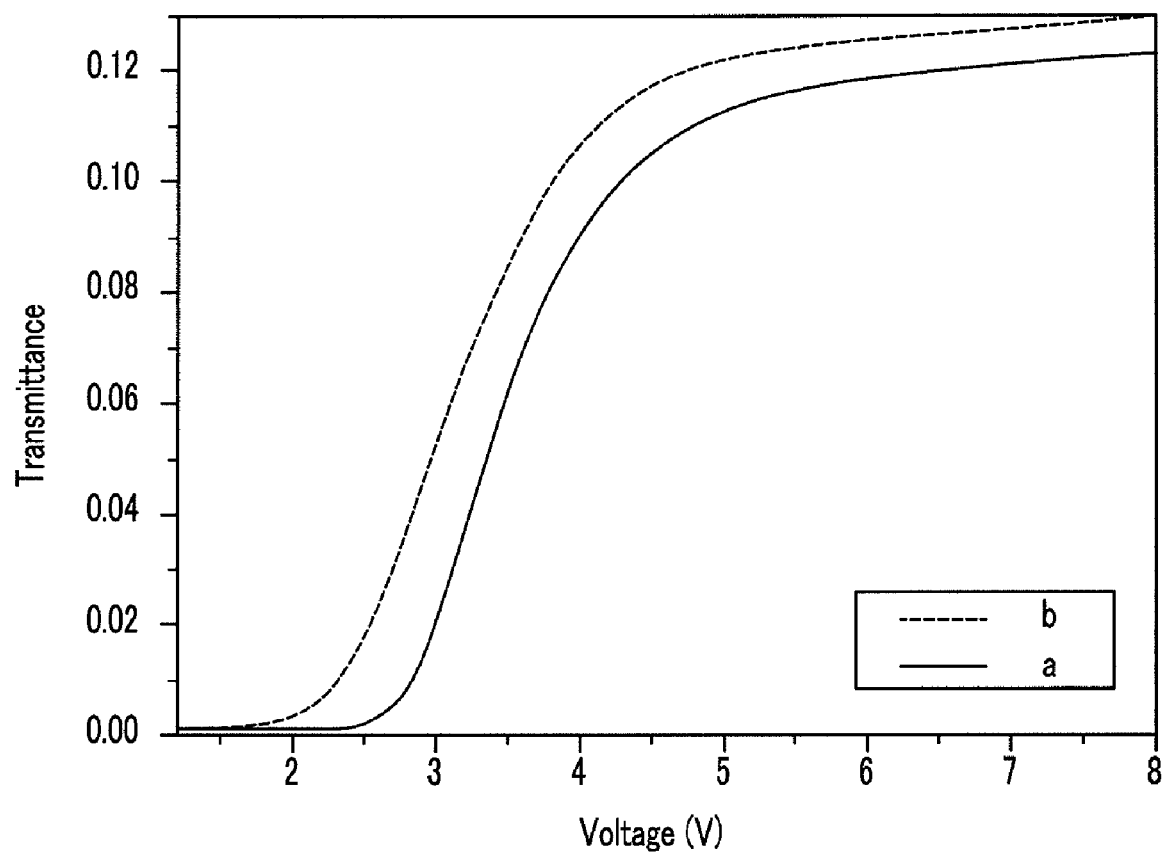
FIG. 14A and FIG. 14B are graphs illustrating the voltage versus transmittance (V-T) curve of a liquid crystal display according to an exemplary embodiment of the present invention.

FIG. 12(a) and FIG. 12(b) are photographs illustrating a variation in luminance of a liquid crystal display according to an exemplary embodiment of the present invention, and FIG. 13(a) and FIG. 13(b) are photographs illustrating a maximum luminance of a liquid crystal display according to an exemplary embodiment of the present invention. FIG. 14(a) and FIG. 14(b) are graphs illustrating the voltage versus transmittance (V-T) curve of a liquid crystal display according to an exemplary embodiment of the present invention.

According to an exemplary embodiment of the present invention, pixels similar to those of the liquid crystal display shown in FIG. 8 to FIG. 10 are formed and tested. FIG. 12(a)

illustrates a case where a direction controlling electrode is formed such that it can be overlapped with one or more of the cutouts of the pixel electrode, and different voltages are applied to the direction controlling electrodes, the pixel electrodes, and the common electrode, respectively. In this case, the liquid crystal molecules are not photo-aligned. FIG. 12(a) illustrates an exemplary embodiment of the present invention where an auxiliary electrode can be overlapped with one or more of the cutouts of the pixel electrode. Voltages similar in magnitude to the voltages described above in reference to FIG. 12(a) may be applied to the pixel electrodes and the common electrode during the initial alignment period, and voltage similar in magnitude to that applied to the direction controlling electrodes described above in reference to FIG. 12(a) may be applied to the auxiliary electrodes to photo-aligning the liquid crystal molecules. Thereafter, the voltage applied to the auxiliary electrodes may be intercepted, and voltages may be applied to the pixel electrodes and the common electrode.

Other conditions described above may be applied here. For example, the width of the auxiliary electrode or the direction controlling electrode may be about 6 μm, the distance between the pixel electrode neighbors may be about 8 μm, and the width of the overlapped region between each pixel electrode and auxiliary electrode or direction controlling electrode may be about 1 μm. Furthermore, with the liquid crystal display used in relation to an exemplary embodiment of the present invention, the size of one pixel is about 88 μm×264 μm, the dielectric anisotropy of the liquid crystal layer is about −4.2, the refractive anisotropy of the liquid crystal layer is about 0.079, the cell distance is about 4.0 μm, and dΔn=0.316 μm.

The transmittance of a liquid crystal display as a function of the driving time thereof according to an exemplary embodiment of the present invention is described below with reference to FIG. 12(a) and FIG. 12(b). FIG. 12A and FIG. 12B illustrate the luminance of one pixel 2 ms, 4 ms, and 9 ms after the liquid crystal display is driven. Compared to the liquid crystal display shown in FIG. 12(b) where the direction controlling electrode is formed and the liquid crystal molecules are not photo-aligned, the liquid crystal display according to an exemplary embodiment of the present invention shown in FIG. 12(a) has a relatively high luminance from the early part of the driving, and the luminance difference thereof is increased as the driving time passed. The variation in transmittance shown in FIG. 12(a) and FIG. 12(b) can be numerically expressed in the following way. When compared in the period of time from the early part of the voltage application until the transmittance is elevated by about 90%, the liquid crystal display shown in FIG. 12(a) has a time period of about 9.8 ms, whereas the liquid crystal display according to an exemplary embodiment of the present invention shown in FIG. 12(b) has a time period of about 5.9 ms. Accordingly, the response speed of the liquid crystal display according to an exemplary embodiment of the present invention shown in FIG. 12(b) is reduced by 3.9 ms, compared to that of the liquid crystal display shown in FIG. 12(a) where the direction controlling electrode is formed and the liquid crystal molecules is not photo-aligned. Accordingly, the liquid crystal display according to an exemplary embodiment of the present invention has a higher response speed and higher transmittance during the same driving time period.

The maximum transmittance of a liquid crystal display according to an exemplary embodiment of the present invention will be described with reference to FIG. 13(a) and FIG. 13(b). FIG. 13(a) and FIG. 13(b) illustrate the maximum transmittance of the liquid crystal display. The maximum transmittance of the liquid crystal display according to an exemplary embodiment of the present invention shown in FIG. 13(b) is higher than that of the liquid crystal display shown in FIG. 13(a) where the direction controlling electrode is formed and the liquid crystal molecules are not photo-aligned. The transmittance shown in FIG. 13(a) and FIG. 13(b) can be numerically expressed in the following way. In the case of the liquid crystal display shown in FIG. 13(a) where the direction controlling electrode is formed and the liquid crystal molecules are not photo-aligned, the maximum transmittance is about 0.1136, and the response time for producing the maximum transmittance is about 9.8 ms. By contrast, in the case of the liquid crystal display according to an exemplary embodiment of the present invention shown in FIG. 13(b), the maximum transmittance is about 0.1189, and the response time for producing the maximum transmittance is about 5.8 ms. Accordingly, the liquid crystal display according to an exemplary embodiment of the present invention involves high response speed and high transmittance.

Finally, the voltage versus transmittance curve of a liquid crystal display according to an exemplary embodiment of the present invention will be described with reference to FIG. 14(a) and FIG. 14(b). FIG. (a) and FIG. 14(b) illustrate the voltage versus transmittance curve of the liquid crystal display. The voltage versus transmittance curve of the liquid crystal display according to an exemplary embodiment of the present invention shown in FIG. 14(b) is moved to the left side, compared to the voltage versus transmittance curve of the liquid crystal display shown in FIG. 14(a) where the direction controlling electrode are formed and the liquid crystal molecules are not photo-aligned. Accordingly, the liquid crystal display shown in FIG. 14(b) can exhibit high transmittance with a slight difference in voltage, compared to that shown in FIG. (a).

Accordingly, the liquid crystal display according to an exemplary embodiment of the present invention has good electro-optical characteristic and a simplified driving method, compared to the liquid crystal display where the direction controlling electrode is formed and the liquid crystal molecules are not photo-aligned.

While this invention has been described in connection with exemplary embodiments, it is to be understood that the invention is not limited to the disclosed embodiments.

What is claimed is:

1. A liquid crystal display comprising:
   a first field generating electrode having a plurality of cutouts;
   a thin film transistor connected to the first field generating electrode;
   an auxiliary electrode overlapped with one or more of the plurality of cutouts of the first field generating electrode, the auxiliary electrode being floated during a period of image display;
   a second field generating electrode facing the first field generating electrode; and
   a liquid crystal layer interposed between the first and second field generating electrodes,
   wherein the liquid crystal layer comprises a plurality of liquid crystal molecules and photo-polymers.

2. The liquid crystal display of claim 1, wherein a predetermined voltage is applied to the auxiliary electrode during a period of initial aligning, and the auxiliary electrode is floated during the period of image display.

3. The liquid crystal display of claim 2, wherein the predetermined voltage applied to the auxiliary electrode during the period of initial aligning is greater than a voltage applied to the first field generating electrode.

4. The liquid crystal display of claim 3, wherein the predetermined voltage applied to the auxiliary electrode is about two times greater than the voltage applied to the first field generating electrode.

5. The liquid crystal display of claim 1, wherein the second field generating electrode has a continuous surface that is free of cutouts.

6. The liquid crystal display of claim 2, wherein the second field generating electrode has a continuous surface that is free of cutouts.

7. The liquid crystal display of claim 1, wherein the auxiliary electrode is located under the first field generating electrode.

8. The liquid crystal display of claim 2, wherein the auxiliary electrode is located under the first field generating electrode.

9. The liquid crystal display of claim 1, wherein the liquid crystal molecules are pre-tilted in a plurality of different directions when no voltage is applied to the first and second field generating electrodes.

10. The liquid crystal display of claim 9, wherein the liquid crystal molecules are pre-tilted by the photo-polymers.

11. The liquid crystal display of claim 1, wherein the pre-tilt direction of the liquid crystal molecules is determined by:
the magnitude of the voltages applied to the auxiliary electrode and the first and second field generating electrodes during the period of initial aligning; and
the plurality of cutouts.

12. The liquid crystal display of claim 1 further comprising data and gate lines connected to the thin film transistor.

13. The liquid crystal display of claim 12, wherein each of the plurality of cutouts extend at an oblique angle to the gate line or the data line.

14. The liquid crystal display of claim 13, wherein the oblique angle is about 45 degrees.

15. The liquid crystal display of claim 13, wherein the auxiliary electrode is of a similar planar shape to each of the plurality of cutouts that overlap the auxiliary electrode.

16. The liquid crystal display of claim 1, wherein the auxiliary electrode is larger in width than any of the plurality of cutouts, and is partially overlapped with the first field generating electrode.

17. The liquid crystal display of claim 2, wherein the auxiliary electrode is larger in width than any of the plurality of cutouts, and partially overlapped with the first field generating electrode.

18. The liquid crystal display of claim 16, wherein the width of each of the plurality of cutouts is about 3.5 μm to 4.5 μm, and the auxiliary electrode and the first field generating electrode are overlapped with each other at two sides of the plurality of cutouts.

19. The liquid crystal display of claim 17, wherein the width of each of the plurality of cutouts is about 3.5 μm to 4.5 μm, and the auxiliary electrode and the first field generating electrode are overlapped with each other at two sides of the plurality of cutouts.

20. The liquid crystal display of claim 18, wherein the width of the overlapped region between the auxiliary electrode and the first field generating electrode is about 1.5 μm to 2.5 μm.

21. The liquid crystal display of claim 19, wherein the width of the overlapped region between the auxiliary electrode and the first field generating electrode is about 1.5 μm to 2.5 μm.

22. The liquid crystal display of claim 1, wherein at least a part of the auxiliary electrode is exposed through the cutouts of the first field generating electrode.

* * * * *